(12) United States Patent
Song et al.

(10) Patent No.: US 7,858,233 B2
(45) Date of Patent: Dec. 28, 2010

(54) ELECTRODE-ACTIVE ANION-DEFICIENT NON-STOICHIOMETRIC LITHIUM IRON-PHOSPHATE, METHOD FOR PREPARING THE SAME, AND ELECTROCHEMICAL DEVICE USING THE SAME

(75) Inventors: Kyu Ho Song, Daejeon (KR); Wan Jae Myeong, Daejeon (KR); Soo Yeong Han, Daejeon (KR); Kyoo Seung Han, Busan (KR)

(73) Assignee: Hanwha Chemical Corporation, Seoul (KR)

( * ) Notice: Subject to any disclaimer, the term of this patent is extended or adjusted under 35 U.S.C. 154(b) by 0 days.

(21) Appl. No.: 12/685,749

(22) Filed: Jan. 12, 2010

(65) Prior Publication Data
US 2010/0183924 A1    Jul. 22, 2010

(30) Foreign Application Priority Data
Jan. 22, 2009    (KR)    ................ 10-2009-0005540

(51) Int. Cl.
*H01M 4/00*    (2006.01)
(52) U.S. Cl. ................ 429/221; 429/210; 429/218.1
(58) Field of Classification Search .............. None
See application file for complete search history.

(56) References Cited

U.S. PATENT DOCUMENTS

| 6,632,566 | B1 | 10/2003 | Yamada et al. |
| 7,217,474 | B2 | 5/2007 | Yamada et al. |
| 2003/0170542 | A1 | 9/2003 | Barker et al. |
| 2006/0194113 | A1* | 8/2006 | Okada et al. ............. 429/231.9 |
| 2006/0263286 | A1 | 11/2006 | Wu et al. |
| 2007/0207080 | A1 | 9/2007 | Yang |

FOREIGN PATENT DOCUMENTS

| EP | A-1094532 | 4/2001 |
| EP | A-1094533 | 4/2001 |
| JP | 2006-0131485 | 5/2006 |
| KR | 10-2001-0025117 | 3/2001 |
| KR | 10-2004-0094762 | 11/2004 |
| KR | 10-2008-0077412 | 8/2008 |
| WO | WO 03-077335 | 9/2003 |

* cited by examiner

*Primary Examiner*—Patrick Ryan
*Assistant Examiner*—Cynthia Lee
(74) *Attorney, Agent, or Firm*—Husch Blackwell LLP

(57) ABSTRACT

The invention provides an anion-deficient non-stoichiometric lithium iron phosphate as an electrode-active material, which is represented by the formula $Li_{1-x}Fe(PO_4)_{1-y}$, wherein $0<x\leq0.15$ and $0<y\leq0.05$. The invention provides a method for preparing said $Li_{1-x}Fe(PO_4)_{1-y}$, which comprises preparing a precursor of lithium iron phosphate; mixing said precursor with water under reaction conditions of 200~700° C. and 180~550 bar to produce lithium iron phosphate; and calcining, or granulating and calcining the resultant compound. The invention also provides electrochemical devices employing said $Li_{1-x}Fe(PO_4)_{1-y}$ as an electrode-active material.

10 Claims, 20 Drawing Sheets

ELECTRODE-ACTIVE ANION-DEFICIENT NON-STOICHIOMETRIC LITHIUM IRON-PHOSPHATE, METHOD FOR PREPARING THE SAME, AND ELECTROCHEMICAL DEVICE USING THE SAME

CROSS-REFERENCE TO RELATED APPLICATION

This application claims the benefit of Korean Patent Application No. 10-2009-0005540, filed on Jan. 22, 2009, which is hereby incorporated by reference as if fully set forth herein.

BACKGROUND OF THE INVENTION

This invention relates to an anion-deficient non-stoichiometric lithium iron phosphate as an electrode-active material, method for preparing the same, and electrochemical device using the same.

Lithium-ion secondary batteries have advantages of light weight and high capacity as compared with other secondary batteries such as nickel-cadmium batteries and nickel-hydrogen batteries. Lithium-ion secondary batteries are used as power sources of electronic instruments and appliances such as mobile phones, laptop computers, game devices, and wireless cleaners. Recently, their application field has been broadening to high-capacity batteries for electric bicycles, electric scooters, service robots, electric cars, and electricity storage devices for power plants.

Lithium-ion secondary batteries have generally been made by employing lithium cobaltate ($LiCoO_2$) as a cathode-active material, carbon as an anode-active material, and lithium hexafluorophosphate ($LiPF_6$) as an electrolyte. However, cobalt as the main component of lithium cobaltate ($LiCoO_2$) suffers from unstable supply and demand, and its cost is high. Thus, it is economically unfeasible to apply cobalt to large-size lithium-ion secondary batteries which require a large amount of cobalt. Accordingly, other materials, such as lithium manganate ($LiMn_2O_4$) of spinel structure, where cobalt is substituted by other transition metals of low cost, began to be commercially used, and lithium transition metal polyanion compounds represented by lithium iron phosphate ($LiFePO_4$) of olivine structure are also undergoing commercialization.

Lithium transition metal polyanion compounds of olivine structure have a stable crystal structure, are highly stable to chemical reactions, and have advantages of high capacity, long life, and low cost. However, their commercialization does not easily progress due to low electron conductivity, low ion conductivity, and by-products formed from side reactions. Among the drawbacks, low electron conductivity may be improved by coating conductive carbon, and low ion conductivity can be improved by shortening lithium ion diffusion routes by making particles ultrafine. However, the composition of a transition metal polyanion compound is prone to change depending on its preparation method, and it is difficult to obtain a compound having a desired composition and a desired oxidation state without impurities. Such impurities and undesirable oxidation states deteriorate the characteristics of the material and batteries, resulting in low productivity, low reliability, and low cost-effectiveness.

For example, during the preparation of $LiFePO_4$, impurities such as $Fe_2O_3$, $LiFeO_2$, and $Fe_2P$ are generated, and most of the iron contained in the impurities has a +3 oxidation state, because iron electrostructurally tends to have an oxidation state of +3 rather than +2, and iron can be easily oxidized during calcination.

If ferric ions ($Fe^{3+}$) are present in lithium iron phosphate, the compound contains impurities which do not have an olivine structure and are not electrochemically active. Accordingly, a lithium iron phosphate containing iron of a +3 oxidation state is inferior to a lithium iron phosphate containing only iron of a +2 oxidation state in characteristics as a battery material. Therefore, efforts have been made to prevent the formation of iron of a +3 oxidation state.

The formation of iron of a +3 oxidation state is suppressed in the anion-deficient non-stoichiometric lithium iron phosphate of the present invention.

Although some non-stoichiometric lithium transition metal polyanion compounds are referred to in published literature, they are different from the compound of the present invention in that they are not anion-deficient compounds but cation-excessive or cation-deficient compounds.

For example, EP-A-1,094,532 describes a method for preparing a compound of the formula $Li_xM_yPO_4$, in which x is greater than 0 and less than or equal to 2, y is greater than or equal to 0.8 and less than or equal to 1.2 and M includes at least one metal having 3d orbitals.

EP-A-1,094,533 and Korean Patent Application Laid-open No. 2001-0025117 describe a compound represented by the general formula $Li_xM_yPO_4$, in which x is greater than 0 and less than or equal to 2, and y is greater than or equal to 0.8 and less than or equal to 1.2, with M containing a 3d transition state, and the grains of $Li_xM_yPO_4$ are no greater in size than 10 micrometers.

U.S. Patent Application Publication No. 2006/0263286A1 and Japanese Patent Application Laid-open No. 2006-131485 disclose a preparation method of olivine $Li_{1+x}Fe_{1+y}PO_4$, wherein $-0.2 \leq x \leq 0.2$ and $-0.2 \leq y \leq 0.2$.

U.S. Patent Application Publication No. 2007/0207080A1 discloses a method for preparing a $Li_xM_yPO_4$ compound having an olivine structure. The method includes: preparing a solution containing transition metal M ions, $Li^+$ ions and $PO_4^{3-}$ ions; drying the solution to form particles of a starting material; and forming the particles of the starting material into particles of the $Li_xM_yPO_4$ compound with an olivine structure, in which $0.8 \leq x \leq 1.2$ and $0.8 \leq y \leq 1.2$, and coating the particles of the $Li_xM_yPO_4$ compound with a carbon layer thereon.

PCT Publication No. WO 2003/077335 and Korean Patent Application Laid-open No. 2004-0094762 disclose, as an electrode active material having the formula $A_{a+x}M_bP_{1-x}Si_xO_4$ wherein (a) A is selected from the group consisting of Li, Na, K, and mixtures thereof, and $0 < a < 1.0$ and $0 \leq x \leq 1$; (b) M comprises one or more metals, comprising at least one metal which is capable of undergoing oxidation to a higher valence state, where $0 < b \leq 2$; and wherein M, a, b, and x are selected so as to maintain electroneutrality of said compound.

However, the lithium compounds referred to in the above literature are cation-deficient or cation-excessive compounds where the molar ratio of the anion like $PO_4^{3-}$ is fixed at 1 and the molar ratio of the cation M varies as in $Li_xM_yPO_4$, and thus are different from the anion-deficient compound of the present invention. The anion-deficient compound of the present invention is a compound represented by $Li_xFe(PO_4)_{1-y}$, wherein the molar ratio of the cation (i.e., iron ion) is 1 and the molar ratio of the anion $PO_4^{3-}$ is less than 1.

Non-stoichiometric lithium iron phosphate is a ceramic material which is an ionic compound. Non-stoichiometric ionic compounds comprising an anion ($X^{y-}$) and a cation ($M^{y+}$) may have four types of point defects, as follows: The first type is a cation-excessive non-stoichiometric compound represented by $M_{1+z}X$. In this formula, the molar ratio of the anion ($X^{y-}$) is 1, which means that all the lattice points of the anion are filled. The molar ratio 1+z of the cation $M^{y+}$ means that all cation lattice points are filled and, in addition, the excessive z mol of the cation $M^{y+}$ are positioned at interstitial sites between lattice points. This type of point defect is called an interstitial cation defect. Here, if 1 mol of $X^{y-}$ having a negative charge of −y is present and 1+z mol of the cation $M^{y+}$ having a positive charge of +y are present in excess of 1 mol, electroneutrality is not satisfied. Accordingly, the oxidation number of the cation cannot be maintained at +y but decreases to +y'(y'=y/(1+z)) to maintain electroneutrality.

The second type is a cation-deficient non-stoichiometric compound represented by $M_{1-z}X$. In this formula, the molar ratio of the anion ($X^{y-}$) is 1, which means that all the lattice points of the anion are filled. The molar ratio 1−z of the cation $M^{y+}$ means that all cation lattice points are not filled but, instead, z mol of the cation lattice points remain as vacancies. This type of point defect is a cation vacancy defect. If the anion $X^{y-}$ having a negative charge of −y exists in an amount of 1 mol and positive ions having a positive charge of +y exist in an amount of 1−z mol, which is less than 1 mol, electroneutrality is not satisfied. Accordingly, the oxidation number of the cation cannot be maintained at +y but increases to +y'(y'=y/(1−z)).

The third type is an anion-deficient non-stoichiometric compound represented by $MX_{1-z}$. In this formula, the molar ratio of the cation ($M^{y+}$) is 1, which means that all the lattice points of the cation are filled. The molar ratio 1−z of the anion $X^{y-}$ means that all anion lattice points are not filled but, instead, z mol of the anion lattice points remain as vacancies. This type of point defect is an anion vacancy defect. If the cation $M^{y+}$ having a positive charge of +y exists in an amount of 1 mol and the negative ions having the negative charge of −y exist in an amount of 1−z mol, which is less than 1 mol, electroneutrality is not satisfied. In ceramic material, cations are in general transition-metal cations and the oxidation number of a transition metal may vary in certain ranges but the oxidation number of an anion is hard to change. Accordingly, the oxidation number of the cation cannot be maintained at +y but reduces to +y'.

The fourth type is an anion-excessive non-stoichiometric compound represented by $MX_{1+z}$. In this formula, the molar ratio of the cation ($M^{y+}$) is 1, which means that all the lattice points of the cation are filled. The molar ratio 1+z of the anion $X^{y-}$ means that all anion lattice points are filled and, in addition, the excessive z mol of the anions are positioned at interstitial sites between lattice points. This type of point defect is an interstitial anion defect. If the cation $M^{y+}$ having a positive charge of +y are present in an amount of 1 mol and the negative ions having the negative charge of −y are present in an amount of 1+z mol, which is less than 1 mol, electroneutrality is not satisfied. Accordingly, the oxidation number of the cation cannot be maintained at +y but increases to +y'(Y'=y(1+z)).

BRIEF SUMMARY OF THE INVENTION

The object of the present invention is to provide an anion-deficient non-stoichiometric lithium iron phosphate, method for preparing the same, and electrochemical device using the same.

The present invention is based on the surprising and unexpected discovery that the electrochemical utility and performance of a lithium iron phosphate can be strikingly improved by controlling the amount and distribution of anion deficiencies and by controlling iron ions to have a desirable oxidation state.

A lithium iron phosphate of the present invention is compositionally and structurally distinct from conventional counterpart compounds.

A compound of the present invention is an anion-deficient non-stoichiometric lithium iron phosphate represented by the following formula:

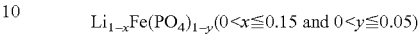

$Li_{1-x}Fe(PO_4)_{1-y}$ (0<x≦0.15 and 0<y≦0.05)

A lithium iron phosphate of the present invention can be used as an electrode-active material for secondary batteries, memory devices, and capacitors including hybrid capacitors (P-EDDC), and other electrochemical devices.

A lithium iron phosphate of the present invention, as compared with conventional lithium iron phosphates, has good physical and chemical stability, provides high capacity, high power, long life, and improved output characteristics for batteries adopting it, and enables the fabrication of a more homogeneous electrode plate, reducing the formation of defective batteries.

In one embodiment, a compound of the present invention can be prepared according to a method which comprises the following steps:

(a) mixing an iron precursor, a phosphate compound, an alkalinizing agent, and a lithium precursor, to prepare a precursor of a lithium iron phosphate;

(b) mixing water with the precursor of the lithium iron phosphate of step (a) under reaction conditions of a temperature of 200~700° C., and a pressure of 180~550 bar to produce anion-deficient non-stoichiometric lithium iron phosphate, and drying the thus-prepared compound; and (c) subjecting the resultant compound of step (b) either to calcination or to granulation and subsequent calcination.

DETAILED DESCRIPTION OF THE INVENTION

Figure 1A:
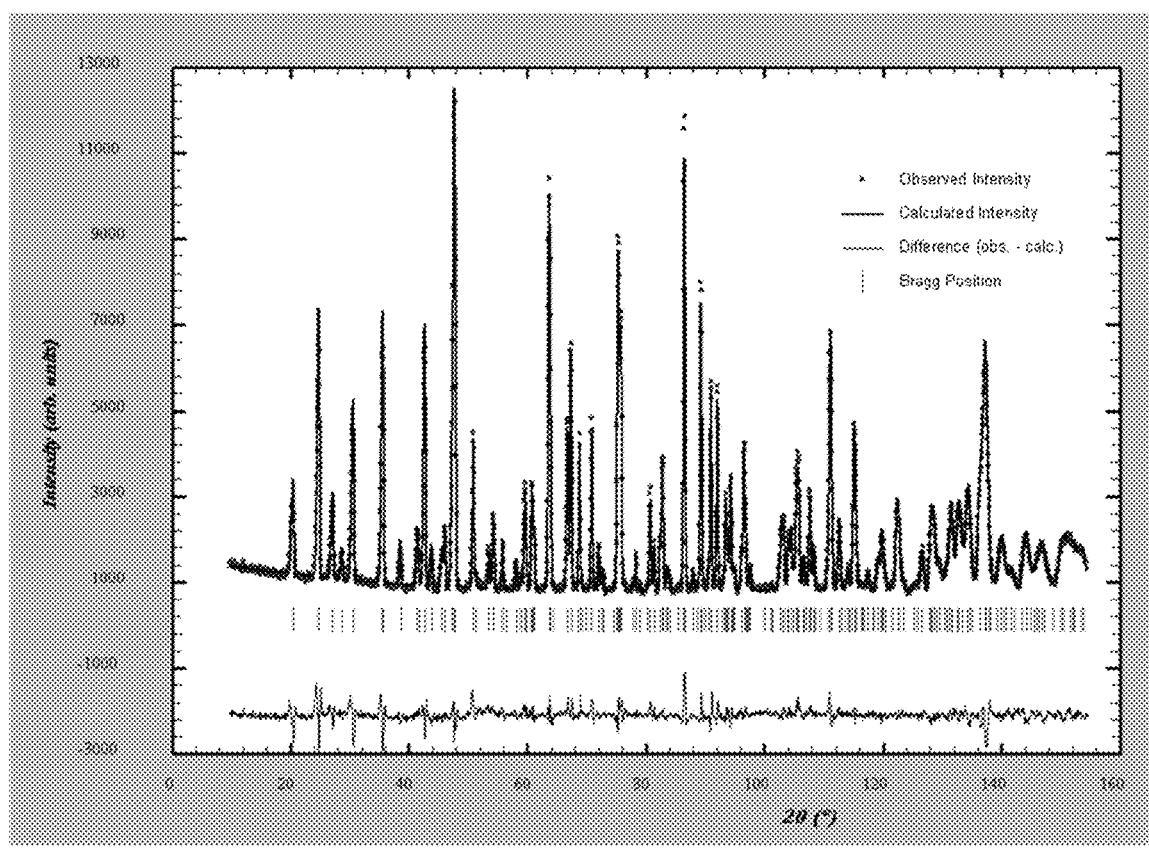
FIG. 1a shows the result of Rietveld refinement of the neutron diffraction pattern obtained from the lithium iron phosphate synthesized in Example 3.
Figure 1B:
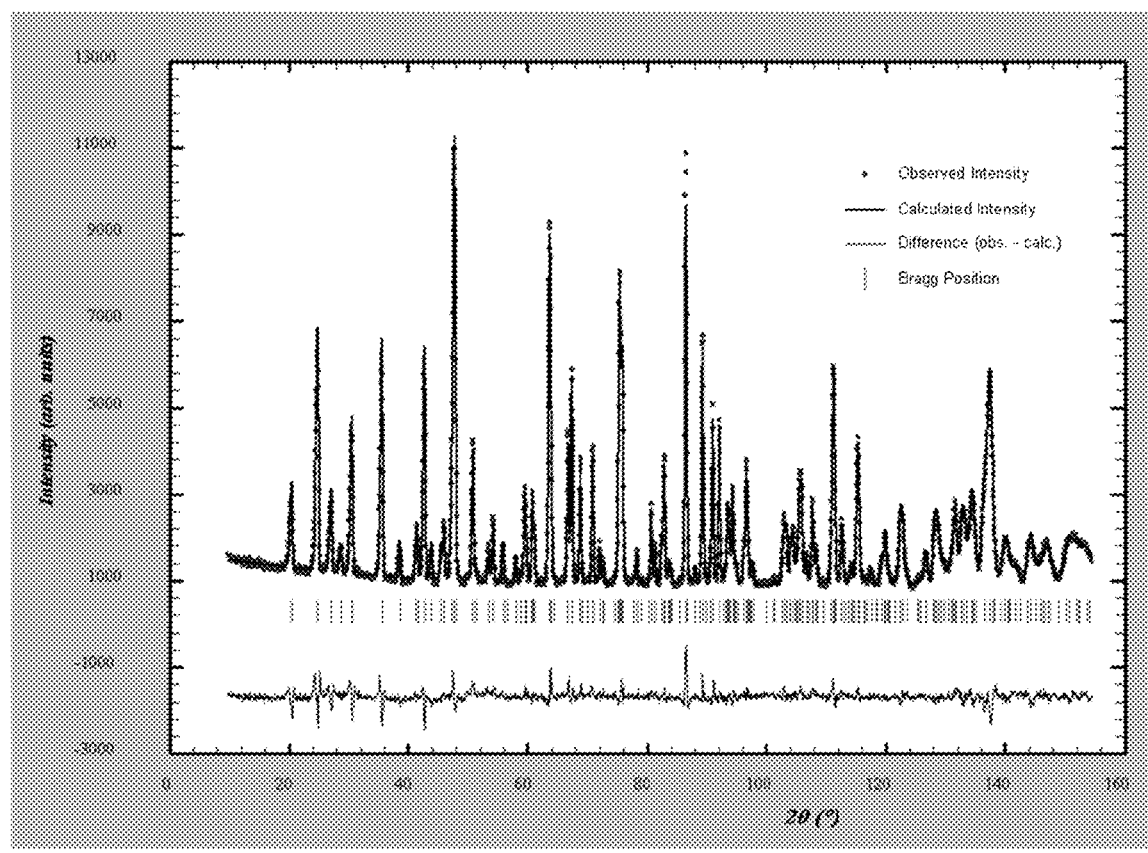
FIG. 1b shows the result of Rietveld refinement of the neutron diffraction pattern obtained from the lithium iron phosphate synthesized in Comparative Example 3.

Hereinafter, the present invention will be explained in detail,

An anion-deficient non-stoichiometric lithium iron phosphate of the present invention is represented by the formula $Li_{1-x}Fe(PO_4)_{1-y}$, wherein $0 > x \leq 0.15$ and $0 > y \leq 0.05$. Preferably, $0.01 \leq y \leq 0.05$ and more preferably, $0.03 \leq y \leq 0.05$.

In the above formula, the molar ratio of the lithium ions means the ratio of the lithium ions which are constituents of the anion-deficient non-stoichiometric lithium iron phosphate. In reality, when preparing a lithium iron phosphate as an electrode-active material, in order to compensate for lithium which volatilizes during calcination or in order to maximize the discharging capacity of a lithium secondary battery, an excessive amount of a lithium precursor is introduced as a reactant. Accordingly, the molar ratio of lithium in a synthesized lithium iron phosphate may be greater than that in the above formula. However, lithium introduced for the above purposes does not exist in the anion-deficient non-stoichiometric lithium iron phosphate of the present invention but is present as an impurity having electrochemical activity. A representative example of such lithium ions is those existing in the form of a surface defect on a crystal.

An anion-deficient compound of the present invention is not limited to a specific shape, but is preferably spherical after granulation.

The size of a compound of the present invention before granulation is preferably between 0.01 μm and 1 μm, but is not limited thereto. After granulation, the size of a granule is preferably 1 μm to 20 μm. If a granule has a size of less than 1 μm, its specific surface area will be too large, thereby making it hard to use for fabricating an electrode. Meanwhile, it is hard for granules having a size exceeding 20 μm to form a uniform slurry, and they deteriorate the thickness uniformity of a thin layer when fabricating an electrode, thereby leading to defective batteries. Anion-deficient compounds of the present invention can have varying shapes, sizes, and size distributions as long as their structural stability and good physical properties are maintained.

An anion-deficient non-stoichiometric lithium iron phosphate of the present invention is suitable as an electrode-active material, especially as a cathode-active material.

An electrode can be made in various ways well-known in the art. For example, an electrode can be made by mixing an anion-deficient compound of the present invention as a cathode-active material with a binder to prepare an electrode slurry, and coating the obtained electrode slurry on a current collector. In making such an electrode, a conducting agent can optionally be used.

The present invention provides an electrochemical device comprising (a) a cathode containing an anion-deficient non-stoichiometric lithium iron phosphate, (b) an anode, (c) a separator, and (d) an electrolyte. Such electrochemical devices include all devices wherein an electrochemical reaction occurs, for example, secondary batteries, memory devices, and capacitors including hybrid capacitors (P-EDDC). Preferred examples of the secondary batteries include lithium secondary batteries such as lithium metal secondary batteries, lithium ion secondary batteries, lithium ion polymer secondary batteries, and lithium metal polymer secondary batteries.

In one embodiment, an electrochemical device of the present invention can be made according to any conventional method known in the art, for example, by interposing a porous separator between a cathode and an anode and adding an electrolyte. There is no limitation to an anode, an electrolyte, and a separator which are used together with a cathode of the present invention, and those conventionally used in electrochemical devices can be adopted.

An anion-deficient non-stoichiometric lithium iron phosphate of the present invention may be synthesized based on a hydrothermal synthesis method that uses supercritical or subcritical water, by controlling reaction variables, such as the mixing ratios of reactants, a temperature of 200~700° C., and a pressure of 180~550 bar.

A reaction temperature below 200° C. makes it difficult to obtain a single-phase high-crystallinity anion-deficient non-stoichiometric lithium iron phosphate, and a temperature above 700° C. heightens the cost of a reactor for synthesizing the compound.

Although hydroxides of alkali metals such as lithium, sodium, and potassium have high solubility in water at ambient temperature and atmospheric pressure, the solubility markedly decreases if the density of water decreases due to high temperature and high pressure. In the case of LiOH, in order to significantly decrease its solubility, it is necessary to maintain the pressure between 180 and 550 bar and the temperature between 200 and 700° C. simultaneously.

Ordinarily, a lithium iron phosphate can be synthesized with various methods including a solid-state reaction method, molten salt sintering method, sol-gel method, spray pyrolysis method, coprecipitation-sintering method, wet precipitation, and hydrothermal method. However, depending on preparation methods, lithium iron phosphates may vary in their composition ratios and in the oxidation states of transition metals, and may contain various amounts of impurities, exhibiting considerable variations in their characteristics as electrode-active materials.

Also, a conventional wet precipitation method, such as a coprecipitation-calcination method, requires 12 to 48 hours for preparing an iron phosphate precipitate, and since the precipitation does not contain lithium ions, the method requires (i) a step for mixing the precipitate with a lithium precursor and (ii) a long heat treatment time for synthesizing lithium iron phosphate crystals and for increasing the crystallinity thereof.

In contrast, a method of the present invention requires only a few seconds at a high temperature and a high pressure for synthesizing an anion-deficient non-stoichiometric lithium iron phosphate. Also, the present method does not require a separate process for mixing the lithium iron phosphate with a lithium source for lithium ion diffusion at a calcination step, because the lithium iron phosphate already contains lithium ions before the calcination step. In addition, in the present method, time needed for calcination is much shorter because a long heat treatment time for lithium ion diffusion is not necessary. Moreover, where a material having small particle size is required, such as lithium iron phosphates of olivine structure which have low lithium ion conductivity, ultrafine particles can easily be prepared in the present method without a separate process for making the particles ultrafine.

The difference between the present method and conventional wet precipitation methods including coprecipitation-calcination methods can be easily understood from the difference between the mechanisms of the two methods. For example, the reaction mechanism of a conventional coprecipitation-calcination method can be divided into the following two steps:

(a) coprecipitation step: $3LiNO_3 + 3Fe(NO_3)_2 \cdot nH_2O + 3(NH_4)_2HPO_4 \rightarrow Fe_3(PO_4)_2 \cdot nH_2O + Li_3PO_4 + 6NH_3 + 9HNO_3$;

(b) calcining step: $Fe_3(PO_4)_2 \cdot nH_2O + Li_3PO_4 \rightarrow 3LiFePO_4 + nH_2O$ For the convenience of understanding, the reaction mechanism of the present method can be demonstrated as follows focusing on the preparation of a stoichiometric lithium iron phosphate:

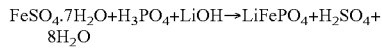

$FeSO_4 \cdot 7H_2O + H_3PO_4 + LiOH \rightarrow LiFePO_4 + H_2SO_4 + 8H_2O$

As can be seen from the two mechanisms, in a conventional coprecipitation-calcination method, $Fe_3(PO_4)_2 \cdot nH_2O$ and $Li_3PO_4$ are formed in a wet process, and a lithium iron phosphate of olivine structure is obtained only through a solid phase reaction between said $Fe_3(PO_4)_2 \cdot nH_2O$ and $Li_3PO_4$ during a dry calcining step.

In contrast, in the present method, an anion-deficient non-stoichiometric lithium iron phosphate is obtained through a single wet process. Although the present method includes a calcining step, this step is for the purpose of enhancing the crystallinity of a product compound.

The composition of a lithium iron phosphate is affected by various factors, such as the mixing ratios of an anion precursor, a phosphate compound, an alkalinizing agent, a lithium precursor and water; the pH of the mixture; and reaction temperature and pressure, etc. By controlling these factors, the composition of a compound can be controlled. Although there can be an optimal combination of said factors for obtaining a compound of a specific composition, the number of combinations for synthesizing compounds of the same composition is not limited to one. Specific combinations of the above factors for obtaining a certain composition would be established by a person of skill in the art without undue experimentation.

A preferred embodiment of the preparation methods comprises the steps of:

(a) mixing an iron precursor, a phosphate compound, an alkalinizing agent, and a lithium precursor to prepare a precursor of lithium iron phosphate;

(b) mixing the precursor of lithium iron phosphate of step (a) with water under a supercritical or subcritical condition to produce an anion-deficient non-stoichiometric lithium iron phosphate, and drying the thus-prepared compound; and (c) subjecting the resultant compound of step (b) either to calcination or to granulation and subsequent calcination to improve crystallinity and adhesion between crystal particles.

Hereinbelow is given a more detailed explanation of each step.

Step a) Preparing a Precursor of an Anion-Deficient Non-Stoichiometric Lithium Iron Phosphate by Mixing an Iron Precursor, a Phosphate Compound, an Alkalinizing Agent, and a Lithium Precursor As an Fe precursor, any compound can be used as long as it is a salt containing iron and can be ionized. Preferred ones are water-soluble compounds. Non-limiting examples of the Fe precursors include alkoxides, nitrates, acetates, halides, oxides, carbonates, oxalates, sulfates, and combinations thereof which contain iron. Particularly, nitrates, sulfates, and acetates are preferred.

As a phosphate compound, any ionizable compound containing the phosphate group can be used. Preferred are water-soluble compounds. Non-limiting examples of the phosphate compounds include phosphoric acid, ammonium phosphate, hydrogen ammonium phosphate, lithium phosphate, and iron phosphate, and combinations thereof.

Any alkalinizing agent can be used as long as it makes a reaction solution alkaline. Non-limiting examples of the alkalinizing agents are alkali metal hydroxides (NaOH, KOH, etc.), alkaline earth metal hydroxides ($Ca(OH)_2$, $Mg(OH)_2$, etc.), ammonium compounds (ammonia water, ammonium nitrate, etc.) and mixtures thereof.

As a lithium precursor, any compound can be used as long as it is a water-soluble salt containing lithium and is ionizable. Non-limiting examples thereof include lithium nitrate, lithium acetate, lithium hydroxide, and lithium sulfate. Particularly, lithium hydroxide is preferred because it serves as a source of lithium and increases alkalinity. The molar ratio of Li to Fe (i.e., Li/Fe) is preferably 1.0 to 20, and more preferably 1.0 to 10. If the value of Li/Fe is too low, only a small amount of lithium participates in the reaction to form an anion-deficient non-stoichiometric lithium iron phosphate, and iron which does not participate in the reaction will form, for example, impurities like iron oxides, and thus reduces the purity of the desired product. Meanwhile, if said value is too high, unreacted lithium remains and it should be recovered from a discharged solution or wasted, thereby lowering economic efficiency.

The alkali equivalent ratio of a mixture containing an Fe precursor, phosphate compound, alkalinizing agent and lithium precursor is preferably 1 to 10, but is not limited thereto. Here, "alkali equivalent ratio" is defined as the ratio between the number of equivalents of hydroxyl ions originating from the alkalinizing agent, etc., and the number of equivalents of acid groups ($NO_3$, $SO_4$, etc.) coming from the Fe precursor and the Li precursor, etc. If the alkali equivalent ratio is too low, impurities will be present in the product, and if it is too high, alkaline content in wastewater will be excessively high.

When mixing said Fe precursor, phosphoric acid compound, alkalinizing agent, and lithium precursor, they can be mixed with water all at once, or they can be separately introduced into water, or the Fe precursor, phosphate compound, alkalinizing agent, and lithium precursor can be mixed first and then the mixture can be introduced into water.

Step b) Producing an Anion-Deficient Non-Stoichiometric Lithium Iron Phosphate By Mixing the Precursor of Anion-Deficient Non-Stoichiometric Lithium Iron Phosphate with Water Under a Supercritical or Subcritical Reaction Condition, and Drying the Thus-Obtained Compound Reaction temperature and pressure should be suitable so that the anion-deficient non-stoichiometric lithium iron phosphate of a desired composition can be produced. A supercritical or subcritical condition used herein is a condition where temperature ranges from 200 to 700° C. and pressure from 180 to 550 bar. Preferably, said condition should be maintained continuously. A continuous reactor type is preferred.

pH during the reaction is preferably greater than 4.0 and equal to or less than 9.0. If the pH is 4.0 or less, the produced anion-deficient non-stoichiometric lithium iron phosphate undesirably dissolves at the low pH. Meanwhile, a pH above 9.0 causes by-products, corrosion of apparatus, and waste of alkalinizing agents, and necessitates separate steps for washing out an excessive amount of alkalinizing agents and for treating a discharged solution, thereby resulting in low economic efficiency.

Mixing is preferably carried out in a continuous mixer such as a tube-type mixer. In such a mixer, an anion-deficient non-stoichiometric lithium iron phosphate is uniformly formed. The reaction product is subject to cooling, concentrating and drying. Before a concentrate is subject to drying, it may be washed with clean water to remove impurity salts (for example, $NH_4NO_3$ salt) and ionic impurities (for example, $NO_3^-$, $SO_4^{2-}$) which can remain in the concentrate.

Step c) Subjecting the Resultant Compound of Step (b) Either to Calcination or to Granulation and Subsequent Calcination An anion-deficient non-stoichiometric lithium iron phosphate produced at step b) has low crystallinity and has a vary small particle size of about 0.01 to 1 μm, and thus it is not suitable for use as a cathode-active material for secondary batteries. Accordingly, step c) improves the crystallinity and controls the size to be suitable for use as a cathode-active material for secondary batteries. Preferred size of the cathode-active material is 1 to 20 μm.

Granulation can be conducted simultaneously with drying using various methods known in the art, such as spray drying, fluidized-bed drying, vibration drying. Particularly, spray drying is preferred because it increases the tap density of granules by making the granules spherical.

Calcination increases the crystallinity of an anion-deficient non-stoichiometric lithium iron phosphate and improves adhesion between crystal particles. Calcination is preferably carried out right after said step (b). Granulation and subsequent calcination are carried out preferably in a continuous manner, because in this case, primary particles, which constitute granules, grow with crystallographic stability. If calcination is not performed, crystals will not be stabilized, and the unstable surface collapses, which causes a serious deterioration in the initial charge and discharge capacities of batteries. Also, without calcination, an electrode-active material will have a large specific surface area, low tap density, and, as a result, low capacity per volume.

Calcining temperature is not limited to a specific range, but is preferably 500 to 1,200° C. Below 500° C., sintering among primary particles may not occur sufficiently, which results in primary particles having low crystallinity and a large specific surface area, and showing a low tap density in an electrode. A lithium iron phosphate of low crystallinity changes to a different material during charge and discharge, thereby deteriorating battery performances, such as charge and discharge capacities and power output, and shortening the life of batteries. Meanwhile, if the sintering temperature is above 1,200° C., excessive sintering among primary particles occurs, which brings about disadvantages such as phase decomposition.

Before, after, or during at least one of the above steps a), b), c), it is possible to add one or more additives selected from the group consisting of binders, sintering aids, doping agents, coating agents, reducing agents, oxidizing agents, carbon or carbon precursors, metal oxides, and lithium compounds.

A binder can be used to make granules spherical and improve particle size distribution. Non-limiting examples of the binders include water, ammonia water, PVA (poly vinyl alcohol), and mixtures thereof.

A sintering aid can be used during the calcination of granules at a high temperature to lower the sintering temperature or to increase sintering density. Non-limiting examples of the sintering aids include metal oxides, such as alumina, $B_2O_3$, MgO, or their precursors; and lithium compounds, such as LiF, LiOH and $Li_2CO_3$.

A doping agent and a coating agent are used to improve the durability of a compound of the present compound. Non-limiting examples thereof include metal oxides, such as alumina, zirconia, titania, and magnesia, and precursors thereof.

A reducing agent or an oxidizing agent can be used to control a certain step to a reducing or oxidizing atmosphere. In the case of anion-deficient non-stoichiometric lithium iron phosphate, a suitable reducing agent can be used to increase electric conductivity and to suppress iron oxidation or for other purposes. Non-limiting examples of the reducing agents include hydrazine, oxalic acid, sucrose, fructose, ascorbic acid, hydrogen, carbon, hydrocarbon, or mixtures thereof. Non-limiting examples of the oxidizing agents include oxygen, hydrogen peroxide, ozone, and their mixtures.

An acid is used to promote a reaction. Non-limiting examples of the acids include phosphoric acid, sulfuric acid, nitric acid, compounds of these acids, and mixtures thereof.

Carbon or its precursors can be used for coating the surface of an anion-deficient compound of the present invention having an olivine structure to improve electric conductivity or to provide a reducing environment. Non-limiting examples of the carbon and carbon precursors include sucrose, ascorbic acid, cellulose, polyvinyl alcohol (PVA), polyethylene glycol (PEG) and mixtures thereof.

A lithium compound can be added in a calcination step to increase lithium content in an anion-deficient non-stoichiometric lithium iron phosphate. Non-limiting examples of the lithium compounds include LiF, LiOH, $LiNO_3$, $Li_2CO_3$ and mixtures thereof.

The present invention can be explained in more detail through the following Examples and Comparative Examples. However, these examples are for the purpose of showing some embodiments of the present invention and they should not be interpreted as limiting the scope of the present invention.

EXAMPLES

Example 1

A first water solution was prepared by dissolving 1 mol of ferrous sulfate heptahydrate ($FeSO_4.7H_2O$), 1 mol of phosphoric acid, and 27.8 g of sucrose in 1.6 L of water. A second water solution was prepared by dissolving 1.1 mol of ammonia and 2 mol of lithium hydroxide in 1.2 L of water. The above two water solutions were mixed by continuously pumping each of them into a mixer at room temperature and a pressure of 250 bar. As a result, a slurry of pH 6.1 containing a lithium iron phosphate precursor was obtained.

The lithium iron phosphate precursor was mixed with ultra-pure water in a mixer by pumping, under a pressure of 250 bar, ultra-pure water of about 450° C. onto the precursor in the mixer. The mixture was moved to a reactor maintained at 380° C. and 250 bar and remained therein for seven seconds. The mixture formed an anion-deficient non-stoichiometric lithium iron phosphate having low crystallinity. The lithium iron phosphate was cooled and concentrated.

The concentrate was mixed with sucrose of 10 wt % based on the weight of the lithium iron phosphate component in the concentrate, and the mixture was spray-dried in a spray dryer to form granules. The dried granules were calcined for 10 hours at 700° C., thereby producing an anion-deficient non-stoichiometric lithium iron phosphate with improved crystallinity and improved adhesion between crystal particles.

The synthesized anion-deficient non-stoichiometric lithium iron phosphate was assayed with an inductively coupled plasma atomic emission spectrometer, super conducting quantum interference device, and Mössbauer spectrometer. The compound was found to contain Li, Fe, and P at a molar ratio of 0.880:1:0.960. (As set forth above, for the purpose of maximizing the discharging capacity of a lithium secondary battery etc., Li may be added in an excessive amount when preparing a lithium iron phosphate. Such excessively added Li was excluded from the amount of lithium in calculating the above molar ratio of Li:Fe:P. The molar ratio counted only the Li which constituted the non-stoichiometric lithium iron phosphate of the present invention. The molar ratio of Li was calculated in the same way in the other Examples given below.) The existence of anion vacancies was confirmed with a transmission electron microscope (TEM), etc.

Example 2

A first water solution was prepared by dissolving 1 mol of ferrous sulfate heptahydrate ($FeSO_4.7H_2O$), 1 mol of phosphoric acid, and 27.8 g of sucrose in 1.6 L of water. A second water solution was prepared by dissolving 1.3 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 8.4 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 0.877:1:0.959 and have anion deficiencies.

Example 3

A first water solution was prepared by dissolving 1 mol of ferrous sulfate heptahydrate ($FeSO_4.7H_2O$), 1 mol of phosphoric acid, and 27.8 g of sucrose in 1.6 L of water. A second water solution was prepared by dissolving 1.5 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 8.5 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 0.868:1:0.956 and have anion deficiencies.

Example 4

A first water solution was prepared by dissolving 1 mol of ferrous sulfate heptahydrate ($FeSO_4.7H_2O$), 1.1 mol of phosphoric acid, and 27.8 g of sucrose in 1.6 L of water. A second water solution was prepared by dissolving 1.1 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 5.2 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 0.931:1:0.977 and have anion deficiencies.

Example 5

A first water solution was prepared by dissolving 1 mol of ferrous sulfate heptahydrate ($FeSO_4.7H_2O$), 1.1 mol of phosphoric acid, and 27.8 g of sucrose in 1.6 L of water. A second water solution was prepared by dissolving 1.3 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 7.3 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 0.907:1:0.969 and have anion deficiencies.

Example 6

A first water solution was prepared by dissolving 1 mol of ferrous sulfate heptahydrate ($FeSO_4.7H_2O$), 1.1 mol of phosphoric acid, and 27.8 g of sucrose in 1.6 L of water. A second water solution was prepared by dissolving 1.5 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 8.1 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 0.880:1:0.960 and have anion deficiencies.

Example 7

A first water solution was prepared by dissolving 1 mol of ferrous sulfate heptahydrate ($FeSO_4.7H_2O$), 1.2 mol of phosphoric acid, and 27.8 g of sucrose in 1.6 L of water. A second water solution was prepared by dissolving 1.1 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 4.3 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 0.955:1:0.985 and have anion deficiencies.

Example 8

A first water solution was prepared by dissolving 1 mol of ferrous sulfate heptahydrate ($FeSO_4.7H_2O$), 1.2 mol of phosphoric acid, and 27.8 g of sucrose in 1.6 L of water. A second water solution was prepared by dissolving 1.3 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 5.0 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 0.940:1:0.980 and have anion deficiencies.

Example 9

A first water solution was prepared by dissolving 1 mol of ferrous sulfate heptahydrate ($FeSO_4.7H_2O$), 1.2 mol of phosphoric acid, and 27.8 g of sucrose in 1.6 L of water. A second water solution was prepared by dissolving 1.5 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 6.7 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 0.937:1:0.979 and have anion deficiencies.

Comparative Example 1

A first water solution was prepared by dissolving 1 mol of ferrous sulfate heptahydrate ($FeSO_4.7H_2O$), 1.3 mol of phosphoric acid, and 27.8 g of sucrose in 1.6 L of water. A second water solution was prepared by dissolving 1.1 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 4.0 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 1:1:1 and have anion deficiencies.

Comparative Example 2

A first water solution was prepared by dissolving 1 mol of ferrous sulfate heptahydrate ($FeSO_4.7H_2O$), 1 mol of phosphoric acid, and 27.8 g of sucrose in 1.6 L of water. A second water solution was prepared by dissolving 2 mol of ammonia and 2 mol of lithium hydroxide in 1.2 L of water. The above two water solutions were mixed by pressure-pumping each of them into a mixer at ambient temperature and a pressure of 250 bar. As a result, a slurry of pH 9.1 containing a lithium iron phosphate precursor was obtained.

Said precursor underwent the same processes as in Example 1, thereby forming an anion-deficient non-stoichiometric lithium iron phosphate having low crystallinity. Said low crystalline compound was processed in the same way as in Example 1 to produce a calcined anion-deficient non-stoichiometric lithium iron phosphate and the calcined compound was found to contain Li, Fe, and P at a molar ratio of 0.82:1:0.94 and have anion deficiencies.

Comparative Example 3

A water solution was prepared by dissolving 1 mol of ferrous sulfate heptahydrate ($FeSO_4.7H_2O$), 1 mol of phosphoric acid, 3 mol of lithium hydroxide, and 27.8 g of sucrose in 2.8 L of water. The sucrose was added as a reducing agent and as a carbon-coating agent. The solution was kept in an autoclave in a nitrogen environment for 5 hours at 200° C. so that reactions could occur. The thus-obtained precipitates were washed several times and concentrated, and the concentrate was dried in a vacuum oven at 60° C. for 12 hours. The dried particles underwent heat treatment for 10 hours at 700° C.

The synthesized product was assayed with an inductively coupled plasma atomic emission spectrometer, and the calcined compound was found to contain Fe and P at a molar ratio of 1:1.

Comparative Example 4

1.1 mol of $Li_2CO_3$, 2 mol of $FeC_2O_4 \cdot 2H_2O$, and 2 mol of $(NH_4)_2HPO_4$ were first mixed for 8 hours by using a zirconia ball milling method at 350 rpm. Thereafter, the first mixture was mixed with 39.2 g of sucrose, which was a carbon precursor. The mixture solution was stirred and gelation occurred. The first mixing and the second mixing were separately conducted, because if sucrose were introduced into the first mixture, uniform mixing would be difficult due to sucrose's strong absorption of moisture.

A first heat treatment was conducted on the thus-obtained mixture solution for 8 hours at 500° C., in a nitrogen environment, and thereby a carbon-coated lithium iron phosphate of low crystallinity was obtained. A second heat treatment was conducted on the carbon-coated lithium iron phosphate for 5 hours at 675° C., in a nitrogen environment to increase crystallinity.

The synthesized product was assayed with an inductively coupled plasma atomic emission spectrometer, and was found to contain Fe and P at a molar ratio of 1:1.

Comparative Example 5

A first water solution was prepared by dissolving 1.1 mol of $CH_3CO_2Li \cdot 2H_2O$ and 1 mol of $Fe(NO_3)_3 \cdot 9H_2O$ in 1.6 L of water. A second water solution was prepared by dissolving 1 mol of $(NH_4)_2HPO_4$ in 1.2 L of water. The first water solution and the second water solution were mixed by adding the first water solution to the second water solution slowly in small amounts.

The mixed solution was stirred and gelation occurred. The thus-obtained gel was dried at 80° C. for 24 hours. A first calcination of dry particles was conducted for 8 hours at 500° C. in a nitrogen environment, and thereby a lithium iron phosphate was obtained. A second calcination of the lithium iron phosphate was conducted for 5 hours at 675° C. in a nitrogen environment to increase crystallinity.

The synthesized product was assayed with an inductively coupled plasma atomic emission spectrometer, and was found to contain Fe and P at a molar ratio of 1:1.

Investigation and Evaluation of Characteristics and Performance

The characteristics and performance of the compounds of the present invention and batteries employing the compounds were investigated and evaluated as follows.

Anion Vacancies

The existence of anion vacancy defects was confirmed by conducting Rietveld refinement of neutron diffraction and transmission electron microscopy (TEM).

Table 1a shows the positions of elements in a unit cell identified by carrying out Rietveld refinement on the neutron diffraction pattern of the lithium iron phosphate synthesized in Example 3 and also shows the occupancy ratios of Li, Fe, and P ascertained by performing crystal structure modeling based on the result of the Rietveld refinement (FIG. 1a). Table 1b shows the positions of elements and the occupancy ratios of Li, Fe, and P in the lithium iron phosphate synthesized in Comparative Example 3.

TABLE 1a

| Element | x | y | z | Occupancy Ratio |
|---------|---|---|---|-----------------|
| Li | 0.00000 | 0.0000(5) | 0.00000 | 0.85497 |
| Fe | 0.2820(1) | 0.2525(2) | 0.9733(8) | 1.00000 |
| P | 0.0946(3) | 0.2507(7) | 0.4176(2) | 0.96000 |

TABLE 1b

| Element | x | y | z | Occupancy Ratio |
|---------|---|---|---|-----------------|
| Li | 0.00000 | 0.00000 | 0.00000 | 0.88540 |
| Fe | 0.2818(3) | 0.25000 | 0.9739(3) | 1.00000 |
| P | 0.0947(2) | 0.25000 | 0.4174(5) | 1.00000 |

The occupancy ratios of Li, Fe, and P shown in Table 1a demonstrate that the compound of Example 3 of the present invention is an anion-deficient non-stoichiometric lithium iron phosphate.

Further, the reason why the x, y, z coordinates of the constituent elements of the compound of Example 3 are different from those of the constituent elements of the compound of Comparative Example 3 is that the former compound is an anion-deficient lithium iron phosphate which has anion vacancies, and, as a result, attractive and repulsive forces among the constituent elements change according to Coulomb's law, and thereby the crystal structure is deformed.

Figure 2A:
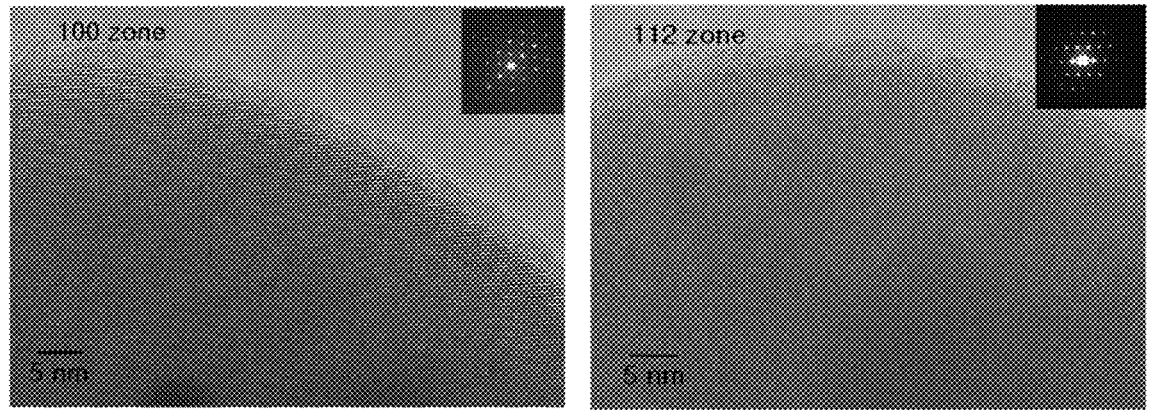
FIGS. 2a and 2c are high-resolution transmission electron microscopy (TEM) images of the stoichiometric $LiFePO_4$ synthesized in Comparative Example 3 and anion-deficient $Li_{0.868}Fe(PO_4)_{0.956}$ of Example 3, respectively.
Figure 2B:
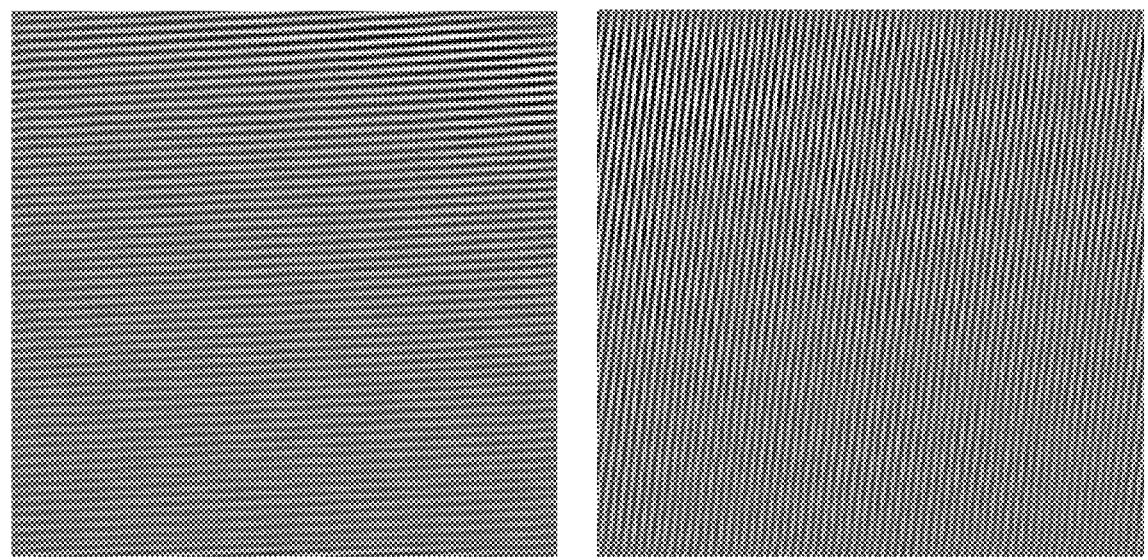
FIGS. 2b and 2d are Fourier-filtered TEM images of the stoichiometric $LiFePO_4$ of Comparative Example 3 and anion-deficient $Li_{0.868}Fe(PO_4)_{0.956}$ of Example 3, respectively.
Figure 2C:
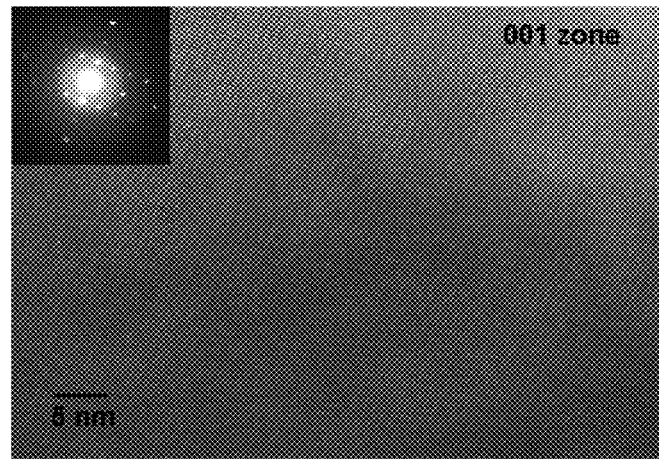
Figure 2D:
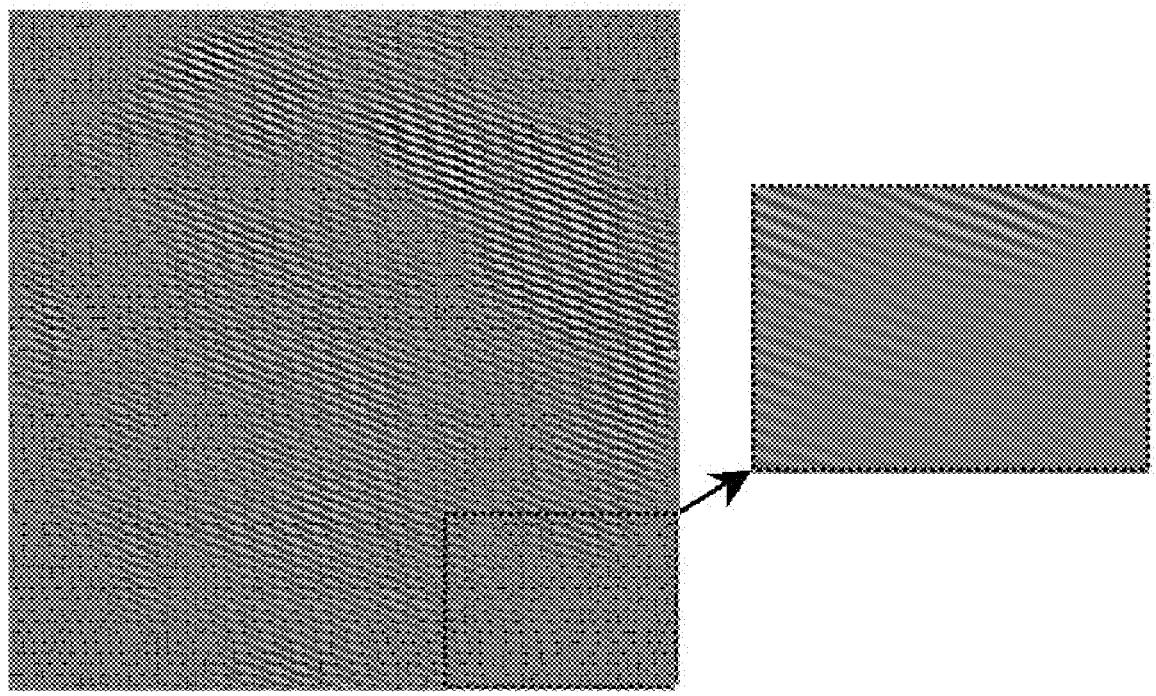

Meanwhile, FIG. 2b is a Fourier-filtered image of the stoichiometric lithium iron phosphate synthesized in Comparative Example 3 and shows high crystallinity. FIG. 2d is a Fourier-filtered image of the non-stoichiometric lithium iron phosphate synthesized from Example 3 and shows not only high crystallinity but also anion vacancies, and also shows that the array of atoms in the vicinities of anion vacancies is changed to a certain degree, giving rise to Y-shaped dislocations throughout the whole area of a crystal particle. In a compound of the present invention, the imperfectness caused by anion-deficiency is an inherent imperfectness of the crystal and leads to a change in the crystal structure, unlike an imperfectness caused by impurities. In a compound of the present invention, a structure modified due to a dislocation in the vicinity of an anion vacancy is a detailed crystal structure of the compound.

Electrode Resistance

Due to anion vacancies, $Li_{1-x}Fe(PO_4)_{1-y}$ of the present invention achieves a superior diffusion coefficient of lithium ions over stoichiometric $LiFePO_4$. As a result, a battery employing a compound of the present invention achieves a low electrode/electrolyte interface (EEI) resistance and a low charge transport (CT) resistance.

For the comparison of electrode resistance related to lithium ion diffusion, potential change and impedance were measured on the anion-deficient $Li_{0.868}Fe(PO_4)_{0.956}$ of Example 3 and the stoichiometric $LiFePO_4$ of Comparative Example 3 with GITT (Galvanostatic Intermittent Titration Technique). The measured impedances are shown in FIG. 3.

Figure 3:
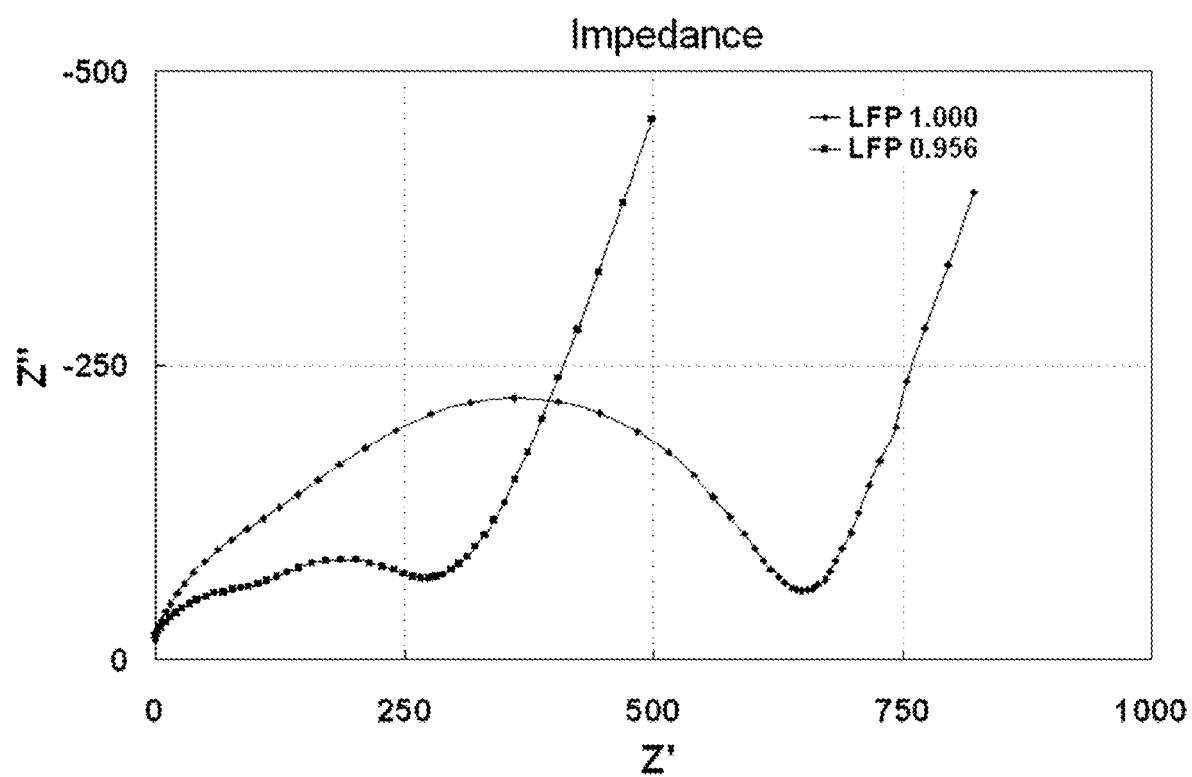
FIG. 3 compares the impedance of the anion-deficient $Li_{0.868}Fe(PO_4)_{0.956}$ of Example 3 and that of the stoichiometric $LiFePO_4$ of Comparative Example 3.

As can be seen in FIG. 3, in the sum of electrode/electrolyte interface(EEI) resistance and charge transport (CT) electrode resistance, the value of $Li_{0.868}Fe(PO_4)_{0.956}$ is 266Ω, which is 2.44 times smaller than that of stoichiometric $LiFePO_4$ having 649Ω.

Diffusion Coefficient of Lithium Ions

Lithium ion diffusion coefficients were measured on anion-deficient $Li_{0.868}Fe(PO_4)_{0.956}$ and stoichiometric $LiFePO_4$ with the GITT method at various charge/discharge conditions. The result is shown in FIG. 4, which is a graph showing the dependency of lithium chemical diffusion coefficients on the lithium concentration x.

Figure 4:
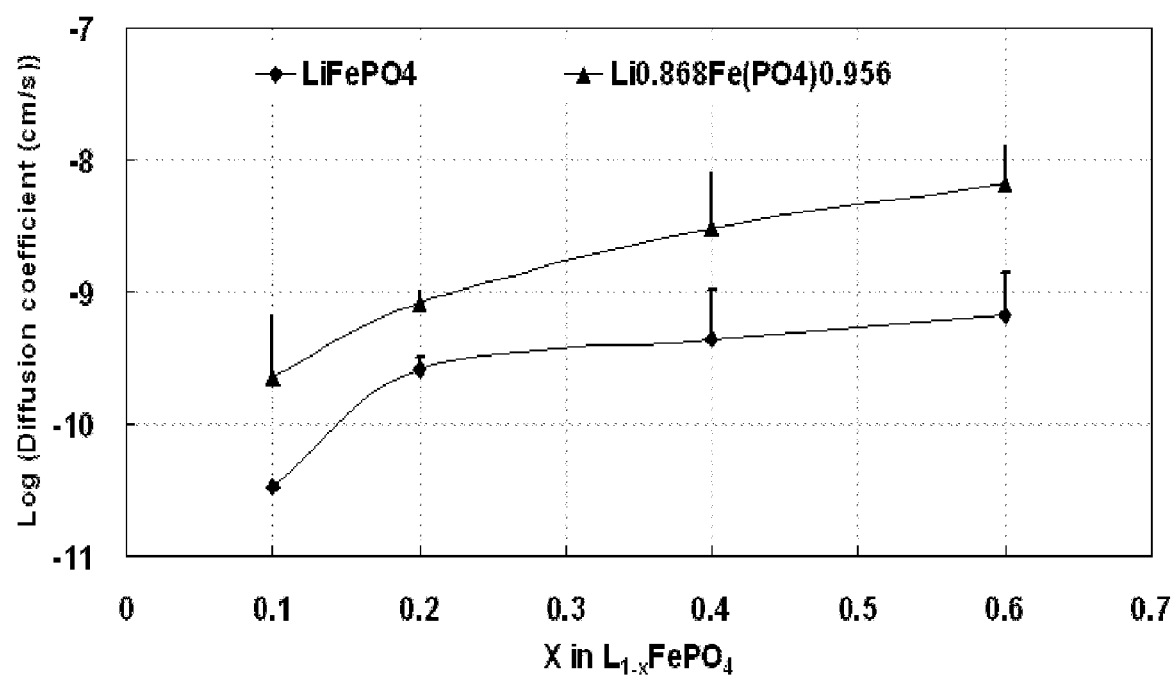
FIG. 4 shows lithium ion diffusion coefficients measured on anion-deficient $Li_{0.868}Fe(PO_4)_{0.956}$ and stoichiometric $LiFePO_4$ with a GITT method at various charge/discharge conditions.

Referring to FIG. 4, the lithium diffusion coefficient of $Li_{0.868}Fe(PO_4)_{0.956}$ is $2.210 \times 10^{-10}$~$6.633 \times 10^{-9}$ cm/S depending on charge/discharge conditions, and that of $LiFePO_4$ is $3.282 \times 10^{-11}$~$6.579 \times 10^{-10}$ cm/S. From this, it is understood that anion-deficient $Li_{0.868}Fe(PO_4)_{0.956}$ is about ten times better than stoichiometric $LiFePO_4$ in lithium diffusion coefficients.

Meanwhile, lithium ion diffusion coefficients of $Li_{0.868}Fe(PO_4)_{0.956}$ and $LiFePO_4$ do not have a fixed value but change depending on charge/discharge conditions. This is because, as the charging of a battery proceeds, the number of lithium ions in an active material decreases, and as the number decreases, the diffusion of lithium ions becomes easier and the lithium diffusion coefficient increases. During discharge, an opposite phenomenon occurs inside the active material, i.e. as discharge proceeds, the number of lithium ions gradually increases in the active material, and as the number increases, the diffusion of lithium ions becomes more difficult and the lithium diffusion coefficient decreases.

Oxidation State of Iron

The magnetic susceptibility of lithium iron phosphates was measured with a Quantum Design MPMS-5 SQUID Magnetometer at a temperature range of 4 to 300K.

Figure 5:
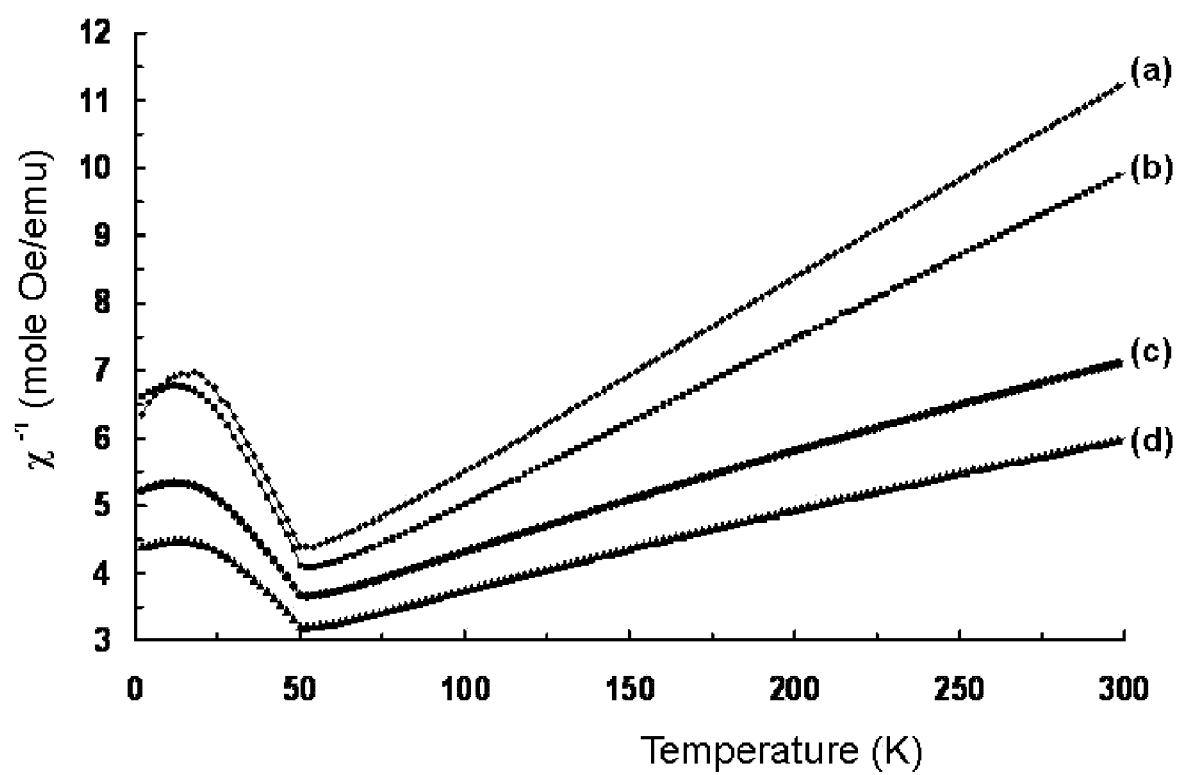
FIG. 5 shows the graphs of the magnetic susceptibility of lithium iron phosphates, wherein graphs (a), (b), (c), and (d) correspond to the compounds synthesized from Example 3, and Comparative Example 1, 4, and 5, respectively.

FIG. 5 shows the magnetic susceptibility of the four lithium iron phosphates containing different amounts of $Fe^{2+}$ and $Fe^{3+}$. Lines (a), (b), (c), and (d) in FIG. 5 are for the compounds synthesized in Example 3, Comparative Example 1, Comparative Example 4, and Comparative Example 5, respectively.

The Néel temperature of the four lithium iron phosphates is 52K, which indicates that all of them have antiferromagnetic arrangement and that all of them are magnetic materials of the Curie-Weiss law. According to the Curie-Weiss law of $1/\chi = (T-\theta)/C$ (wherein $\chi$ is the magnetic susceptibility, C is the Curie constant, T is absolute temperature measured in kelvins, and $\theta$ is the Weiss temperature), the slope of the straight part of each line in FIG. 5 is the reciprocal of the Curie constant, i.e., 1/C, wherein the Curie constant $C=N_A g^2 \mu_B^2 S(S+1)/3k = 0.125 g^2 S(S+1)$, ($N_A$: Avogadro constant, g: Landé constant, $\mu_B$: Bohr magneton, S: total spin quantum number, k: Boltzmann's constant). The total spin quantum number S of $Fe^{3+}$ (the electron configuration $3d^5$, $t_{2g}^3 e_g^2$ having five unpaired electrons) is 5/2, and that of $Fe^{2+}$ (the electron configuration $3d^6$, $t_{2g}^4 e_g^2$ having four unpaired electrons) is 4/2. Thus, as the ratio of $Fe^{3+}$ increases, the Curie constant increases and the reciprocal thereof (i.e., 1/C) decreases.

From the relation that the effective magnetic moment $\mu_{eff} = (3k/N_A)^{1/2}(\chi T)^{1/2} = \{g^2 S(S+1)\}^{1/2}\mu_B$, it is possible to calculate the theoretical effective magnetic moments of $Fe^{2+}$ and $Fe^{3+}$. Under the condition that L=0, if the Landé constant is 2.0023, the theoretical effective magnetic moments of $Fe^{2+}$ and $Fe^{3+}$ are $4.90\mu_B$ and $5.92\mu_B$, respectively. According to Line (a) in FIG. 5, the effective magnetic moment of $4.61\mu_B$ at room temperature and the change in the g value indicate that the anion-deficient non-stoichiometric lithium iron phosphate of the present invention contains only $Fe^{2+}$. Meanwhile, the lithium iron phosphates corresponding to Lines (c) and (d) in FIG. 5 have the high effective magnetic moments of 5.79 to $6.32\mu_B$ at room temperature. As it proceeds from Line (b) to Line (d), the amount of $Fe^{3+}$ in the lithium iron phosphates increases (Line (a): $4.61\mu_B$, Line (b): $4.91\mu_B$, Line (c): $5.79\mu_B$, Line (d): $6.32\mu_B$).

Figure 6A:
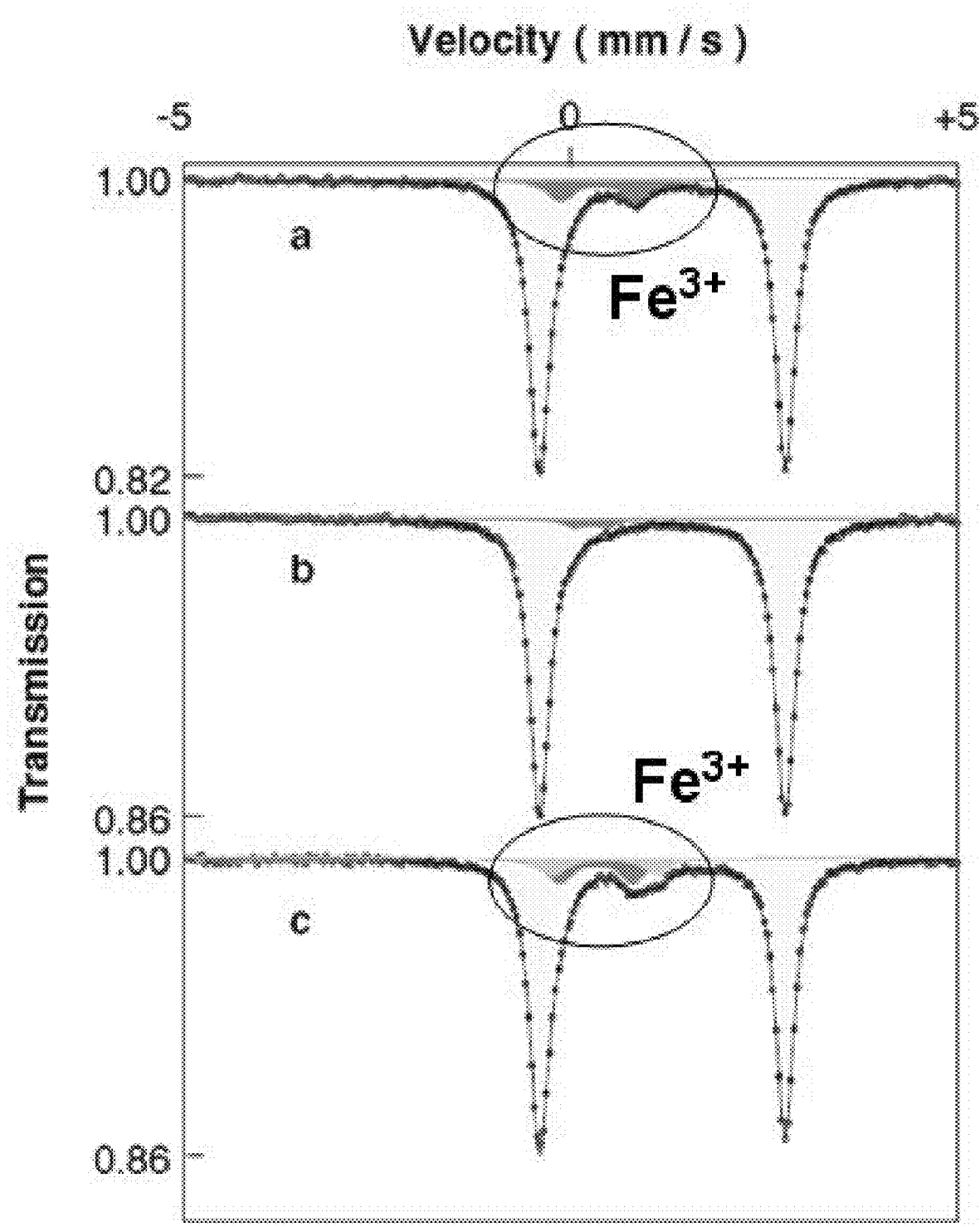
FIG. 6a is the Mössbauer spectroscopy of the lithium iron phosphate of Comparative Example 3 containing a mixture of $Fe^{2+}$ and $Fe^{3+}$.
Figure 6B:
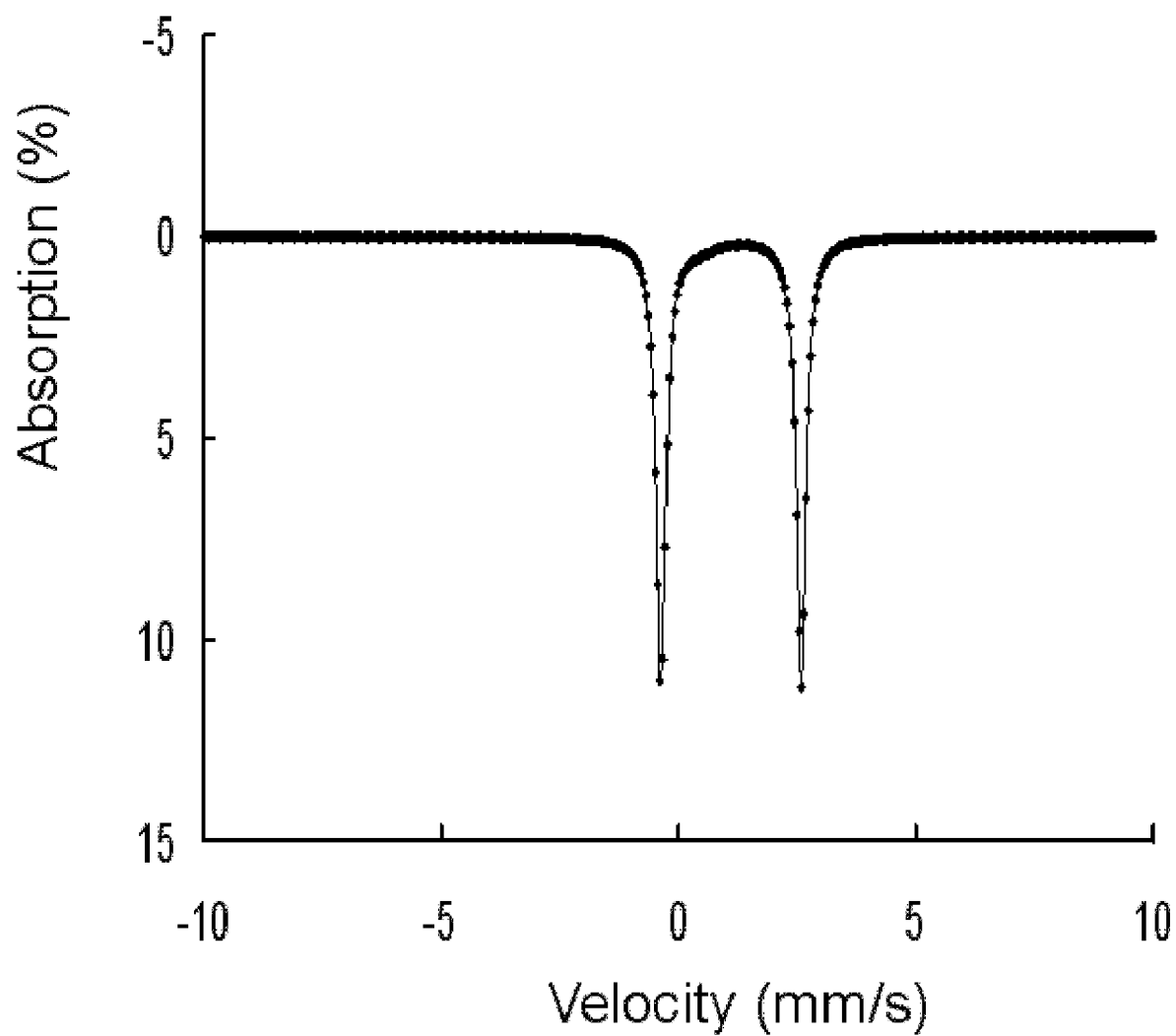
FIG. 6b is the Mössbauer spectroscopy of the anion-deficient $Li_{0.868}Fe(PO_4)_{0.956}$ synthesized from Example 3.

FIG. 6a is the Mössbauer spectroscopy of the lithium iron phosphate of Comparative Example 3 which contains both $Fe^{2+}$ and $Fe^{3+}$. FIG. 6b is the Mössbauer spectroscopy of the anion-deficient non-stoichiometric lithium iron phosphate of the present invention synthesized in Example 3.

For the investigation of the crystal structures of the lithium iron phosphates, step-scan X-ray diffraction patterns were taken with Cu Kα radiation (wavelength λ of 1.5418 Å) for a 2θ range of 5~100° with 0.02° step size and a dwell time of 10 seconds, with a Rigaku D/MAX 2500H.

Figure 7A:
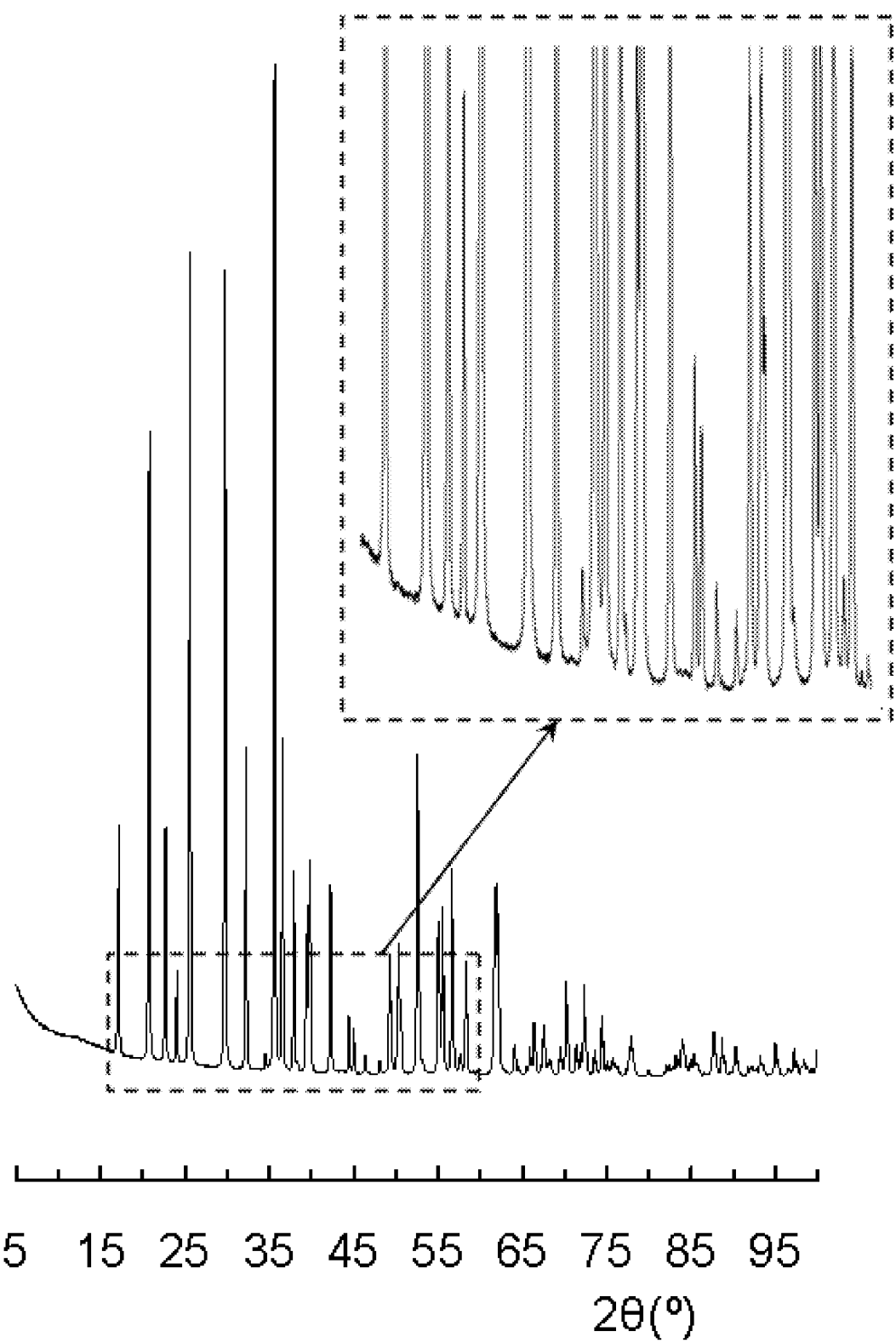
FIG. 7a is the XRD graph of the lithium iron phosphate synthesized from Example 3.
Figure 7B:
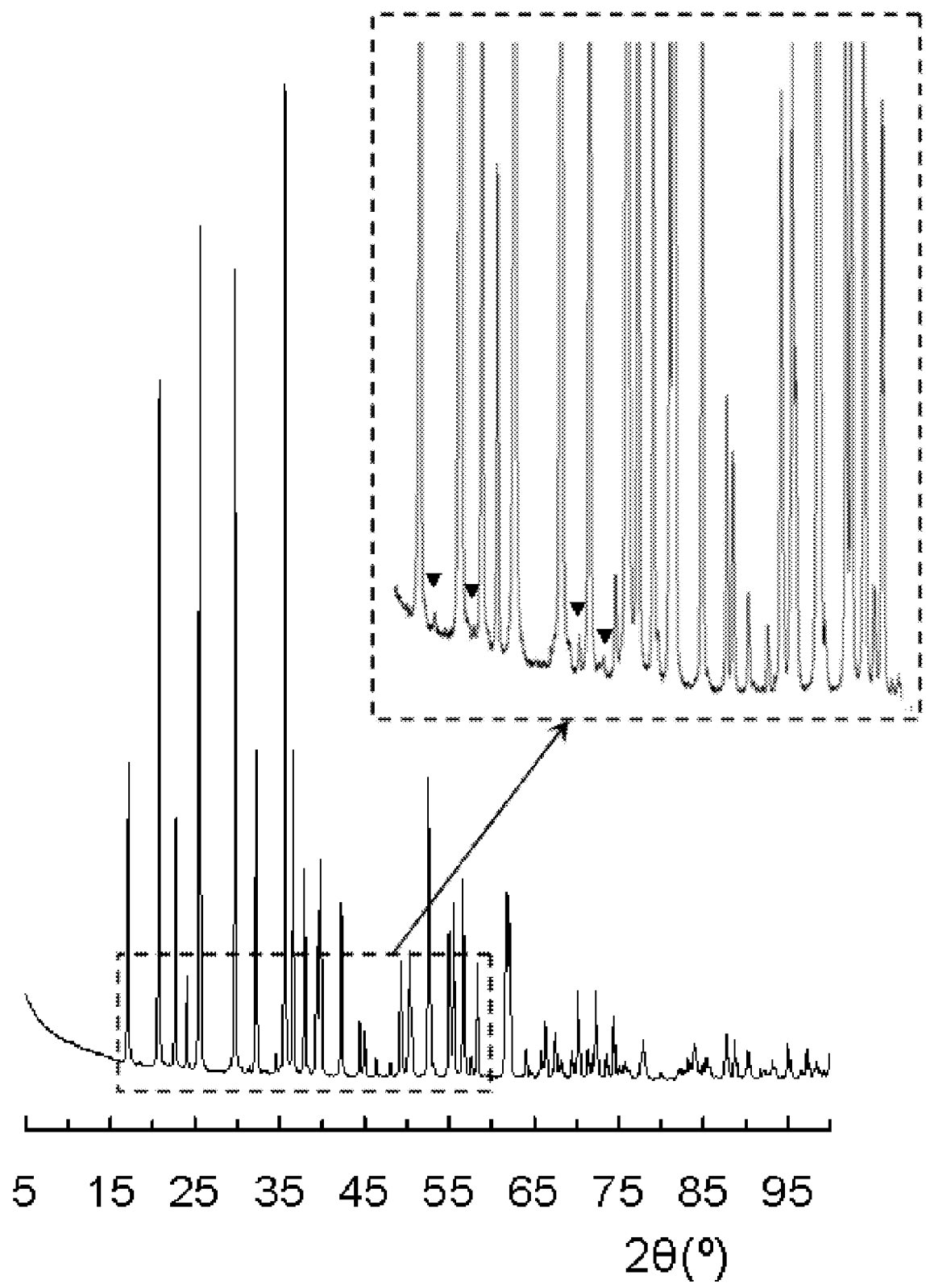
FIG. 7b is the XRD graph of the lithium iron phosphate synthesized from Comparative Example 3.

FIGS. 7a and 7b are XRD graphs of the lithium iron phosphates synthesized in Example 3 and Comparative Example 3. FIG. 7a is the XRD graph of the anion-deficient non-stoichiometric lithium iron phosphate of the present invention containing only $Fe^{2+}$. If the ratio of $Fe^{3+}$ exceeds a certain value, impurity diffraction patterns (▼) appear as shown in the magnified section in FIG. 7b.

Figure 8:
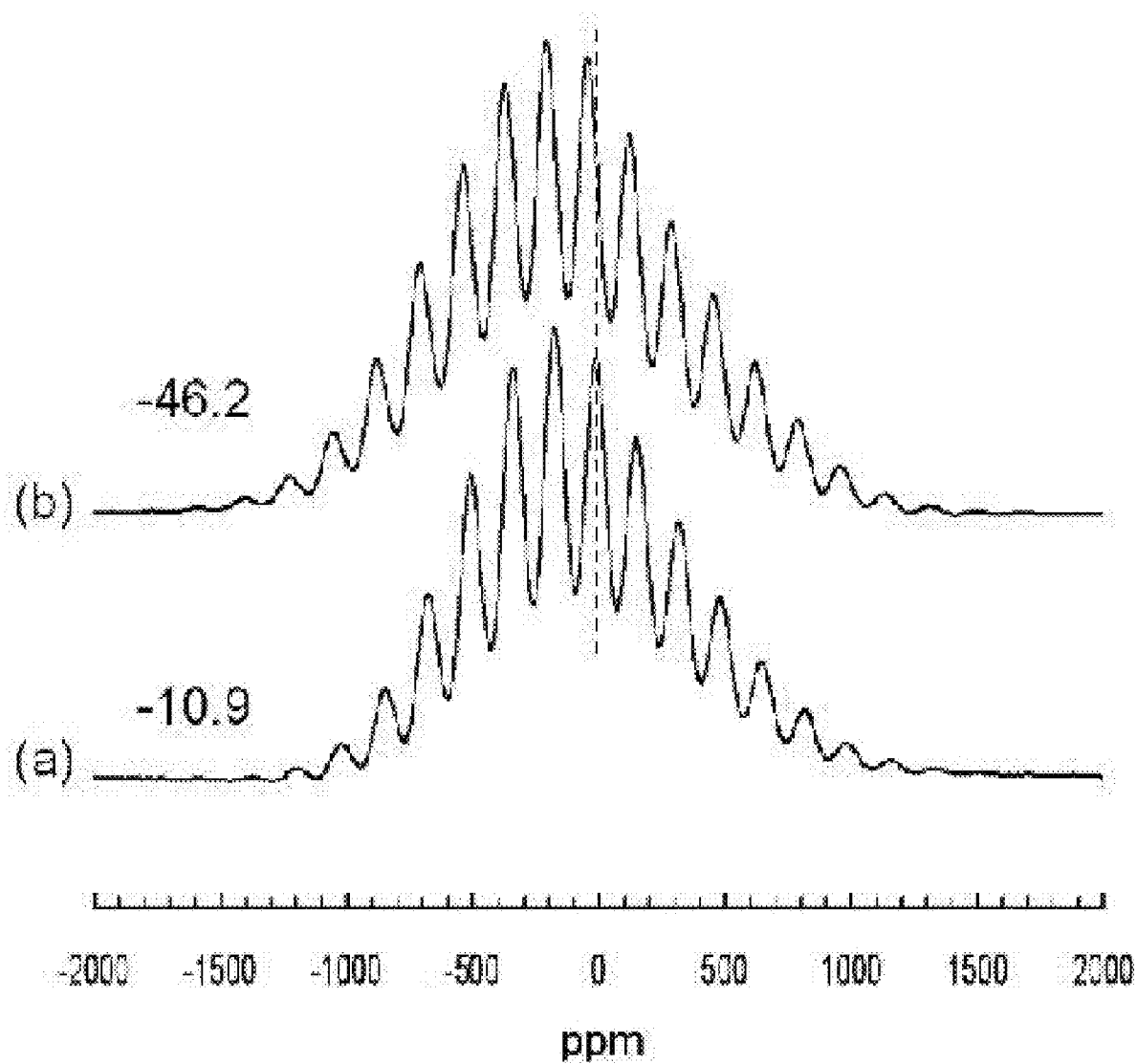
FIG. 8 shows $^7$Li MAS NMR spectra of $Li_{0.868}Fe(PO_4)_{0.956}$ of Example 3 (spectrum (a)) and $LiFePO_4$ of Comparative Example 3 (spectrum (b)).

In order to confirm the synthesis of a lithium iron phosphate and determine the oxidation state of iron by investigating the environment of lithium ions, $^7Li$ magic angle spinning (MAS) nuclear magnetic resonance (NMR) spectroscopy was conducted using a 600 MHz Bruker Advance II+, while slanting the specimen by 15° and fixing specimen rotation speed at 14 kHz in order to reduce the first and second chemical shifts. 1M LiCl solution was used as a standard material. FIG. 8 shows Li-NMR spectra of lithium iron phosphates synthesized in Example 3 (spectrum (a)) and in Comparative Example 3 (spectrum (b)).

Depending on the oxidation state of iron, the number of outermost electrons which do not form an electron pair changes, and such unpaired electrons shift the position of the main Li-NMR peak. In a $C_s$ symmetry structure, each unpaired A' electron shifts the position of a Li-NMR peak by −24~28 ppm, and each unpaired A" electron shifts the position of a Li-NMR peak by +70~+79 ppm. $LiFe(II)PO_4$, which contains iron of a +2 oxidation state, has three A' electrons and one A" electron. $Fe(III)PO_4$, which contains iron of a +3 oxidation state, has three A' electrons. Accordingly, the position of the main Li-NMR peak of lithium iron phosphate containing only $Fe^{2+}$ is in the range −14~+7 ppm. If lithium iron phosphate contains only $Fe^{3+}$, in order to maintain electroneutrality, lithium does not exist and thus no Li-NMR peak appears. However, even though a material is not $Fe(III)PO_4$, if it only contains iron of a +3 oxidation state and if lithium coexists therein, the main Li-NMR peak of the material appears in a range of −84~−72 ppm.

Spectrum (a) in FIG. 8 shows that the main Li-NMR peak is at −10.9 ppm, and thus it also confirms that the anion-deficient compound of Example 3 has only iron of an oxidation state of +2. Meanwhile, spectrum (b) in FIG. 8 shows that the main Li-NMR peak is at −46.2 ppm, and indicates that the stoichiometric compound of Comparative Example 3 contains iron of +3 oxidation state.

Shapes of Compounds

Figure 9A:
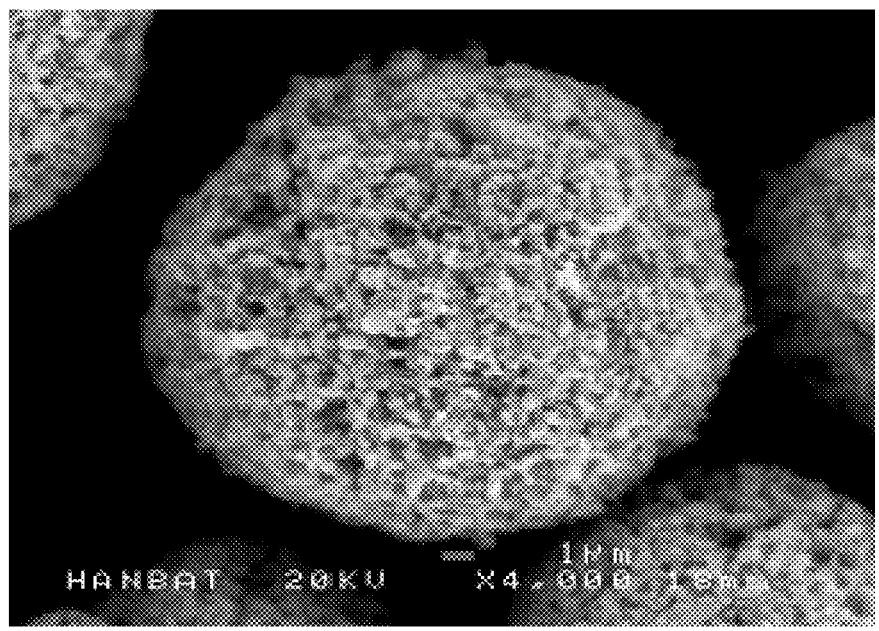
FIG. 9a is a SEM photograph of 4,000 times magnification showing the spherical shape of granulated and calcined lithium iron phosphate particles synthesized in Example 3.
Figure 9B:
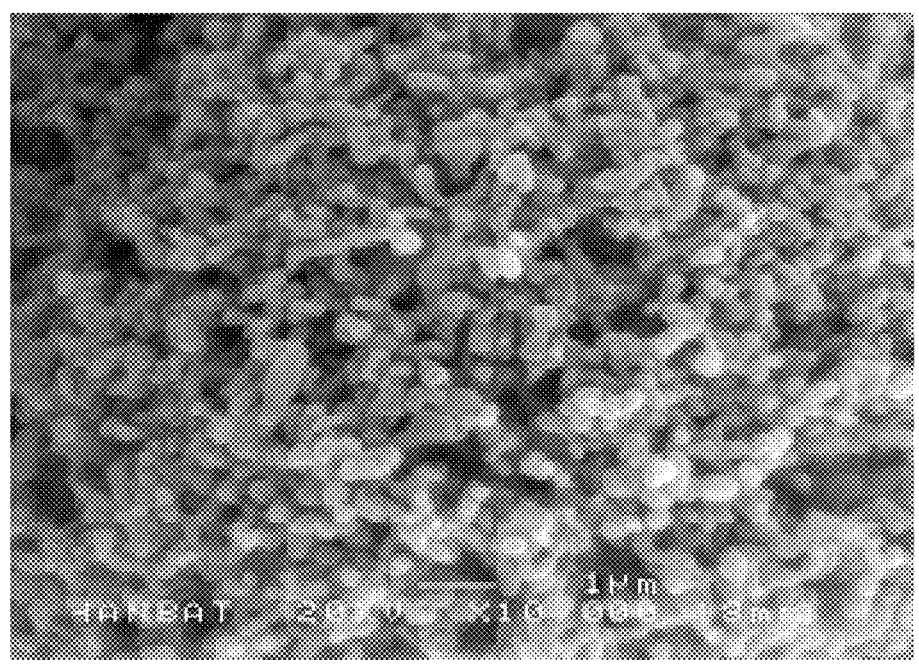
FIG. 9b is a SEM photograph of a granule of Example 3 at a magnification of 10,000 times and shows nanometer-size ultrafine particles which constitute the granule.

The sizes and the shapes of lithium iron phosphate particles can be determined by performing scanning electron microscopy with a JEOL JSM-6300 at an accelerating voltage of 10,000 volt, an emission current of 9,500 nA, and a working distance of 12,400 μm FIG. 9a is a SEM photograph of granulated particles of the anion-deficient non-stoichiometric lithium iron phosphate synthesized from Example 3, and shows that the particle size is 19 μm. FIG. 9b is a SEM photograph of a granule of Example 3 at a magnification of 10,000 times and shows nanometer-size ultrafine particles which constitute the granule.

Charge and Discharge Characteristics

The battery characteristics of anion-deficient non-stoichiometric lithium iron phosphates were evaluated as follows:

A cathode slurry which contained an anion-deficient non-stoichiometric lithium iron phosphate, a conducting agent, and a binder at a weight ratio of 90:5:5 was prepared. In the slurry, the conducting agent was a mixture of super-P® (conductive carbon black produced by TIMCAL Graphite & Carbon, Inc., Switzerland) and vapor-grown carbon fiber (VGCF), wherein the two compounds were contained at the same weight ratio, and the binder was KF1100® (polyvinylidene fluoride produced by Kureha Chemical Ind. Co., Ltd., Japan).

The cathode slurry was applied onto a thin aluminium sheet at an application speed of 0.3 m/min and was dried at 90□ in the front room and 120□ in the rear room of an applicator to fabricate an cathode.

An electrolyte was synthesized by dissolving 1 mol of $LiPF_6$ in a solvent which was a mixture of ethylene carbonate (EC) and ethyl methyl carbonate (EMC) at a volume ratio of 1:2.

A lithium coin cell battery was fabricated. Charge and discharge were conducted at the constant 0.2 C rate by using a Maccor series 4000 Automated Test System (Maccor Inc., Tulsa, Okla., U.S.A.).

FIG. 10 shows charge/discharge test results of lithium secondary batteries adopting, as cathode-active materials, lithium iron phosphates synthesized in Example 3 and Comparative Examples 3, 4, and 5. FIGS. 10a, 10b, and 10c are, respectively, the graphs of the lithium iron phosphates synthesized from Comparative Examples 3, 4, and 5. FIG. 10d is the charge/discharge graph of the anion-deficient lithium iron phosphate of Example 3.

Figure 10A:
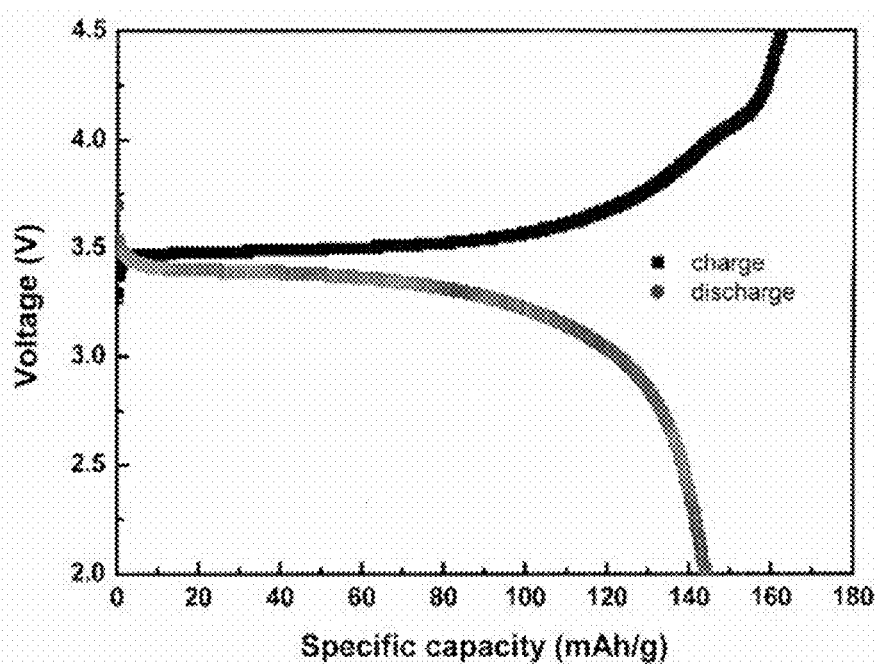
FIGS. 10a, 10b, and 10c show the charge/discharge graphs of lithium secondary batteries adopting, as cathode-active materials, lithium iron phosphates synthesized from Comparative Examples 3, 4, and 5, respectively.
Figure 10B:
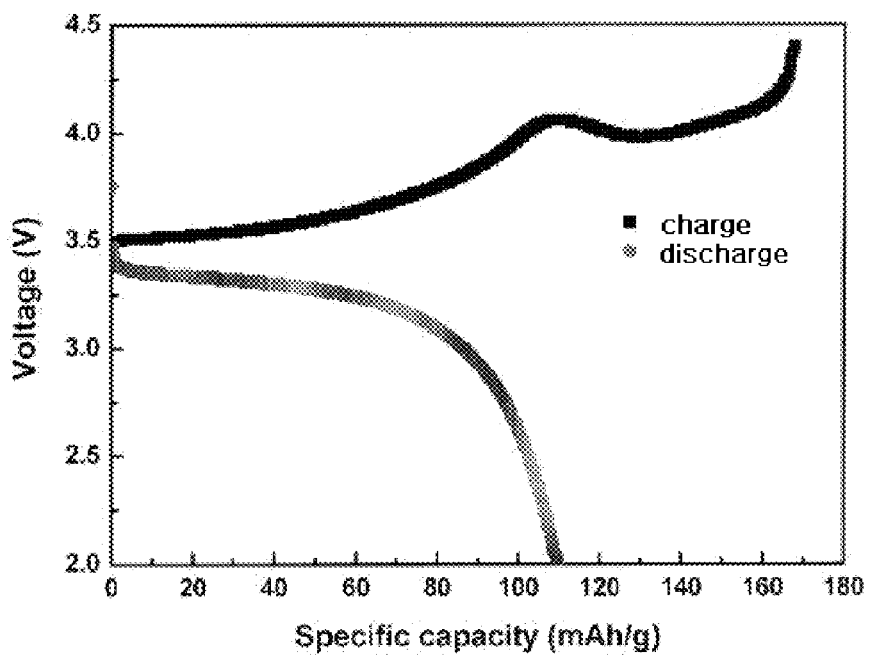
Figure 10C:
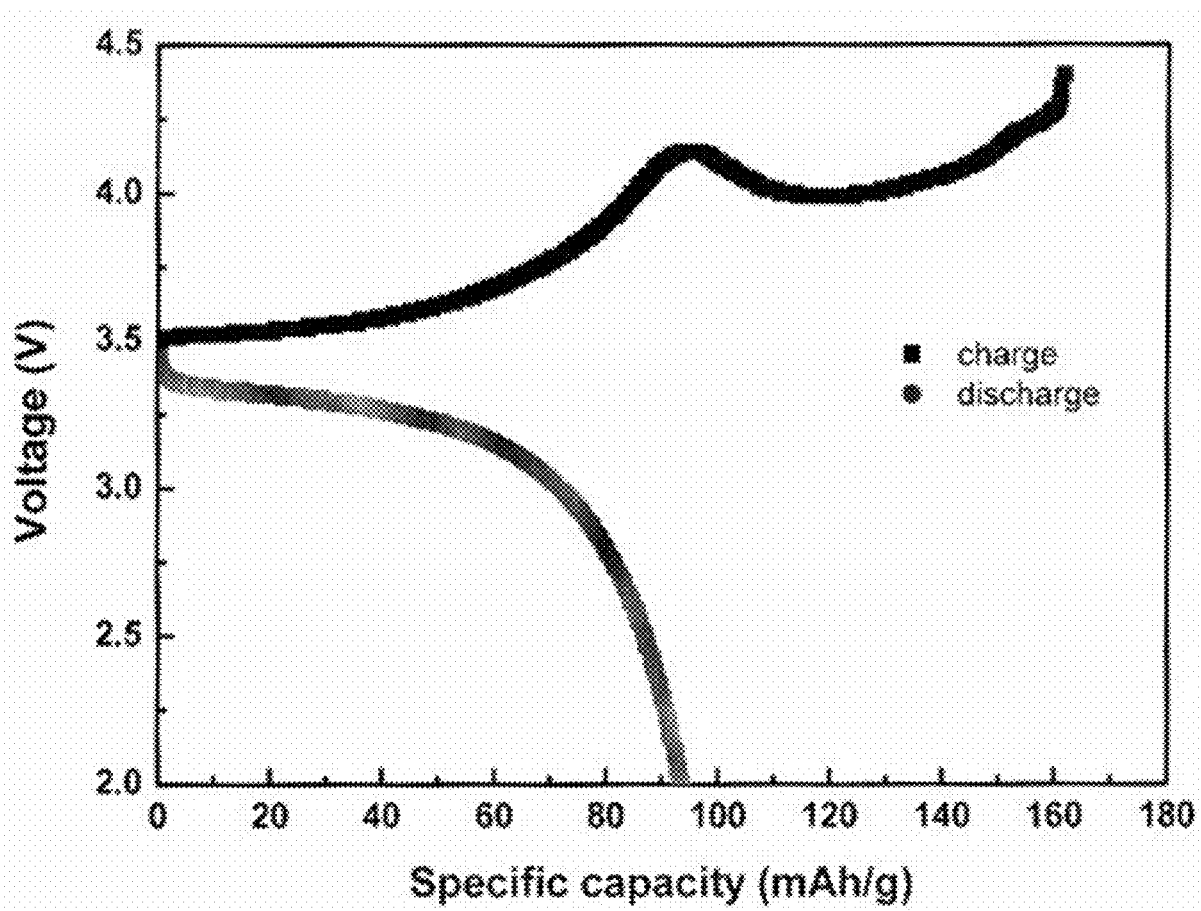
Figure 10D:
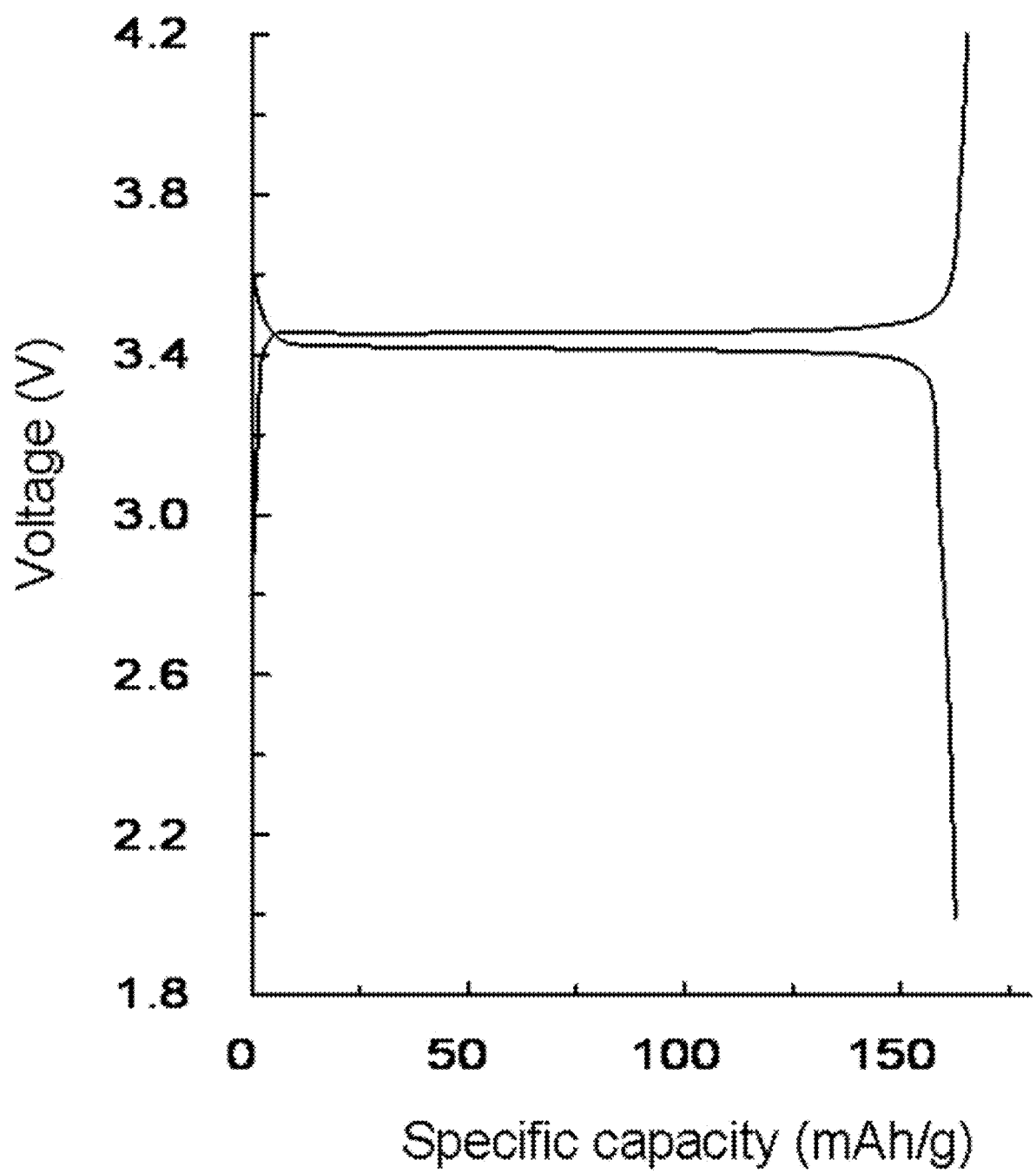
FIG. 10d shows the charge/discharge graph of a lithium secondary battery adopting, as a cathode-active material, the lithium iron phosphate synthesized in Example 3.

The discharge capacities shown in FIGS. 10a, 10b, and 10c are 93~143 mAh/g, which are far less than the discharge capacity of 163 mAh/g shown in FIG. 10d. Further, as can be seen from FIG. 10d, a wide potential plateau appears only in the case of the compound of the present invention.

Figure 11:
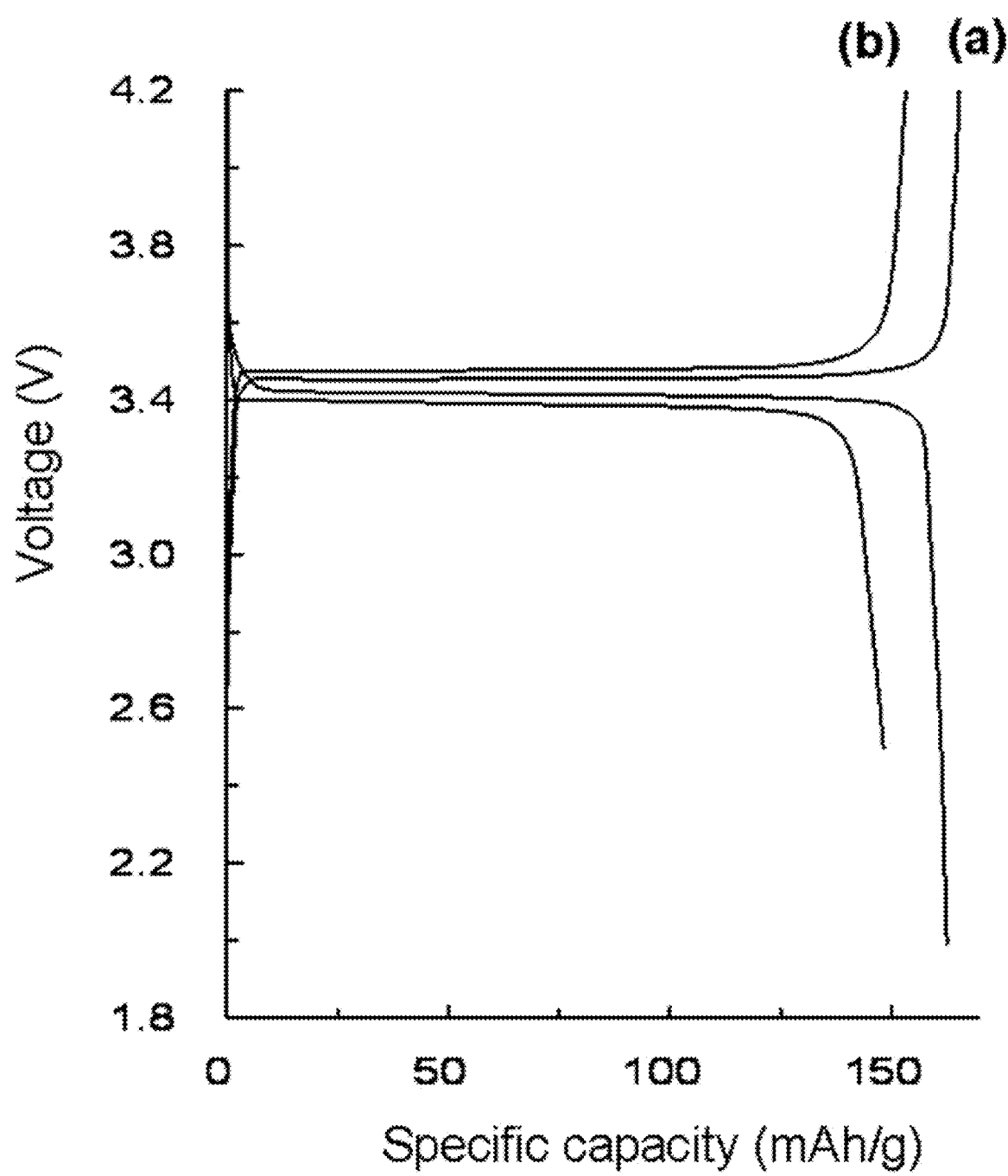
FIG. 11 compares the charge/discharge graphs of lithium secondary batteries adopting lithium iron phosphates as cathode-active materials, wherein graph (a) is for the lithium iron phosphate synthesized in Example 3, and graph (b) is for the lithium iron phosphate synthesized in Comparative Example 3.

FIG. 11 compares the charge/discharge graphs of lithium secondary batteries adopting lithium iron phosphates as cathode-active materials. Charge and discharge were carried out at a rate of 0.2 C. In FIG. 11, graph (a) corresponds to $Li_{0.868}Fe(PO_4)_{0.956}$ synthesized in Example 3, and graph (b) corresponds to $LiFePO_4$ synthesized in Comparative Example 3. Two differences are seen between the former and the latter. The first difference is that the discharge capacity of $Li_{0.868}Fe(PO_4)_{0.956}$ is 162.58 mAh/g, which is far higher than that of $LiFePO_4$, which is 148.32 mAh/g. The second difference is that the gap between the charge potential and the discharge potential is narrower in $Li_{0.868}Fe(PO_4)_{0.956}$ than in $LiFePO_4$. The two differences mean that the compound of the present invention undergoes a more reversible redox reaction in a broader range compared with conventional compounds.

As set forth above, iron of an oxidation state of +3 does not form a lithium iron phosphate of olivine structure, but forms an impurity of a different structure, and $Fe^{3+}$ impurities cannot function as a cathode material. Conventional stoichiometric lithium iron phosphates contain $Fe^{3+}$ impurities.

Figure 12:
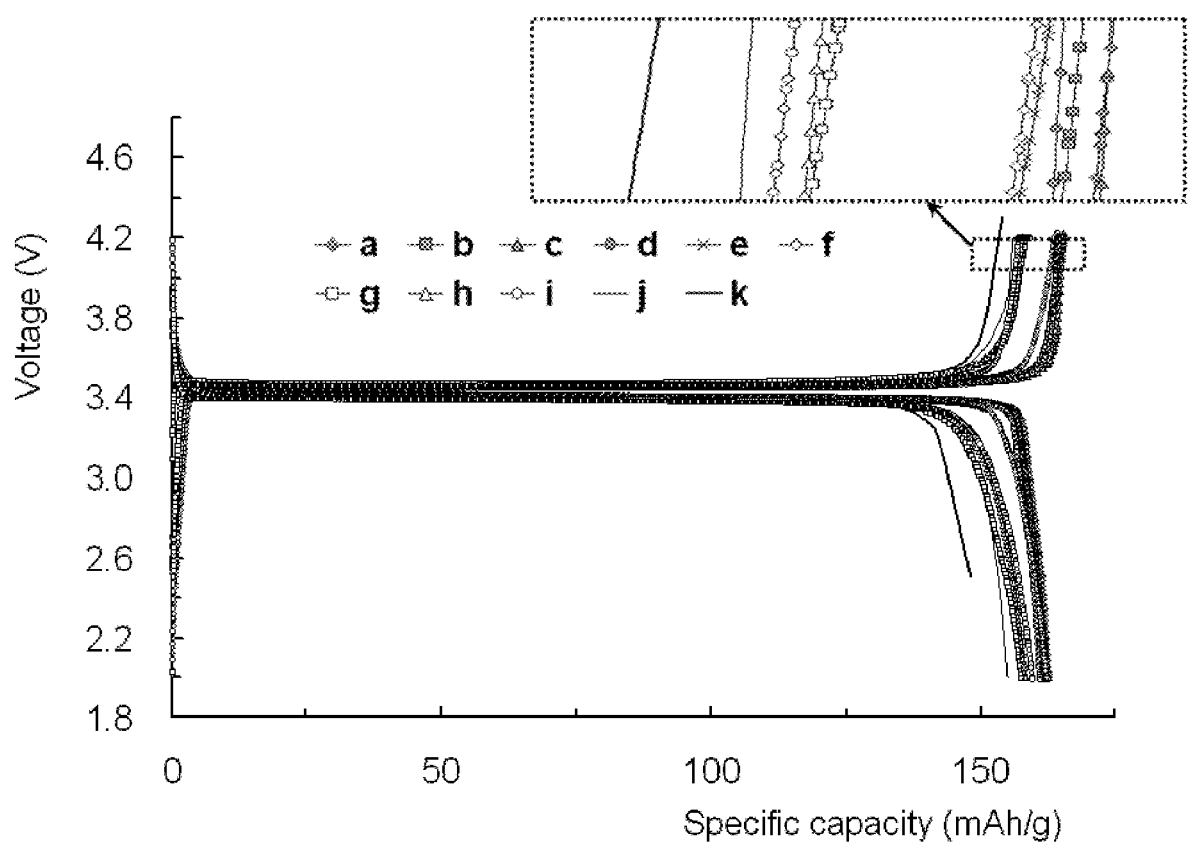
FIG. 12 shows the charge/discharge graphs of lithium secondary batteries adopting various compounds as cathode-active materials. Graphs a, b, c, d, e, f, g, h, and i correspond to the anion-deficient lithium iron phosphates of Examples 1, 2, 3, 4, 5, 6, 7, 8, and 9, respectively; and graphs j and k correspond to the compounds of Comparative Examples 1 and 2, respectively.

FIG. 12 shows charge/discharge curves, at 0.2 C rate, of lithium iron phosphates of Examples 1 to 9 and Comparative Examples 1 and 2.

Figure 13:
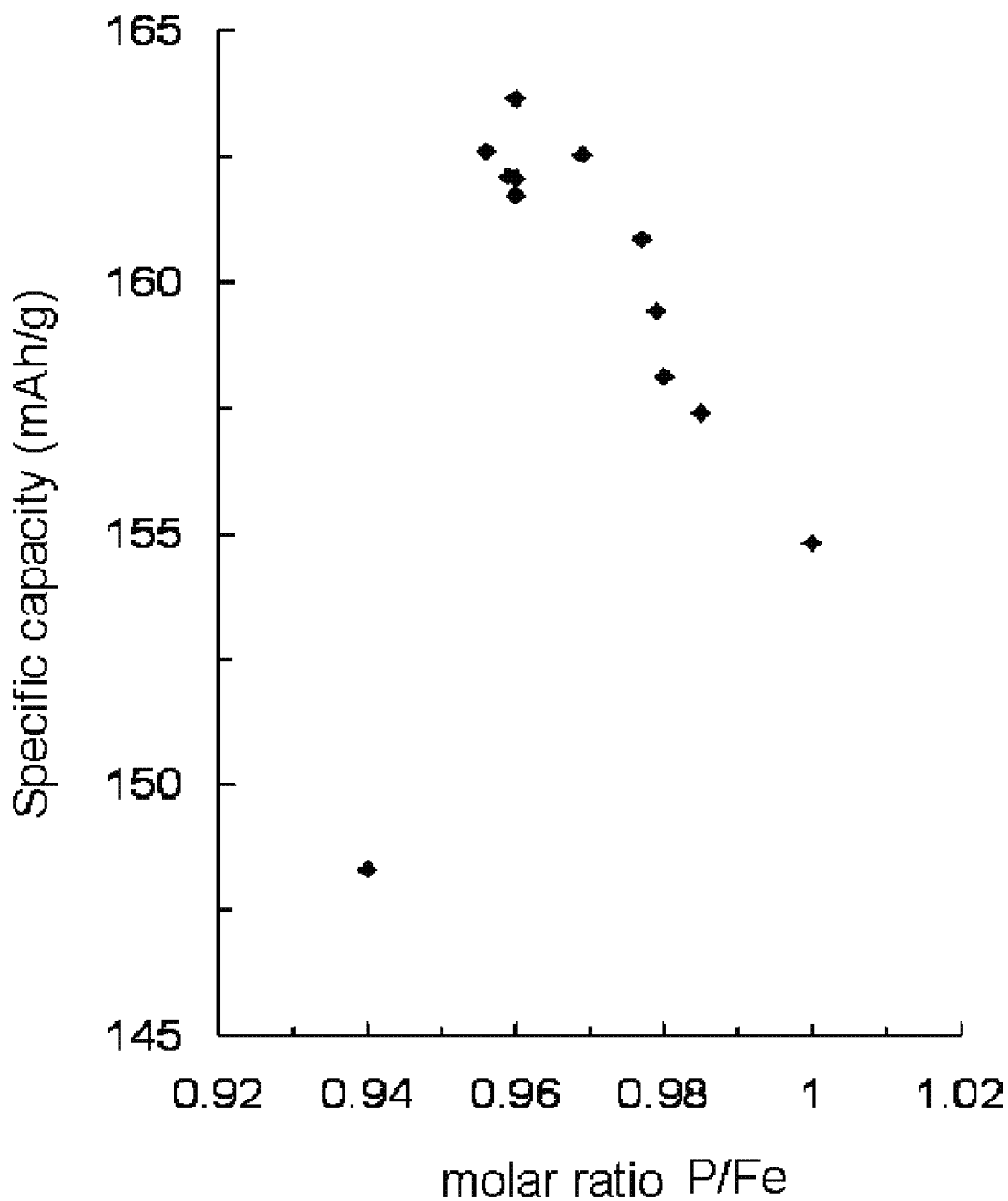
FIG. 13 is a plot of the molar ratio of phosphorus to iron (P/Fe) v. discharge capacity showing the discharge capacities of lithium secondary batteries which employ, as cathode materials, the lithium iron phosphates synthesized in Examples 1 to 9 and Comparative Examples 1 and 2.

FIG. 13 is the molar ratio of phosphorus to iron (P/Fe) vs. discharge capacity plot and shows the discharge capacities of lithium secondary batteries which employ, as cathode materials, lithium iron phosphates synthesized in Examples 1 to 9 and Comparative Examples 1 and 2. As shown in FIG. 13, discharge capacity can be improved by controlling the molar ratio P/Fe to be less than 1. When about $0.95 \leq P/Fe \leq$ about 0.99, the discharge capacity is desirable. If P/Fe is 0.98, the discharge capacity is about 159 mAh/g. A more desirable discharge capacity is achieved if the P/Fe is between about 0.95 and about 0.97. Meanwhile, as the P/Fe changes from 0.95 to 0.94, the discharge capacity greatly changes.

Output Characteristics

Electrochemical characteristics during charge/discharge substantially change depending on the C-rate. It is known that if the C-rate increases, the capacity of a battery decreases and its output characteristics deteriorate. This phenomenon is influenced by the intercalation/de-intercalation of lithium ions and resistance to the movement of lithium ions in an electrode material. A smaller difference between the plateau potential of a charge curve and that of a discharge curve indicates faster intercalation/de-intercalation and easier movement of lithium ions in an electrode material, which leads to improved battery output characteristics.

Figure 14:
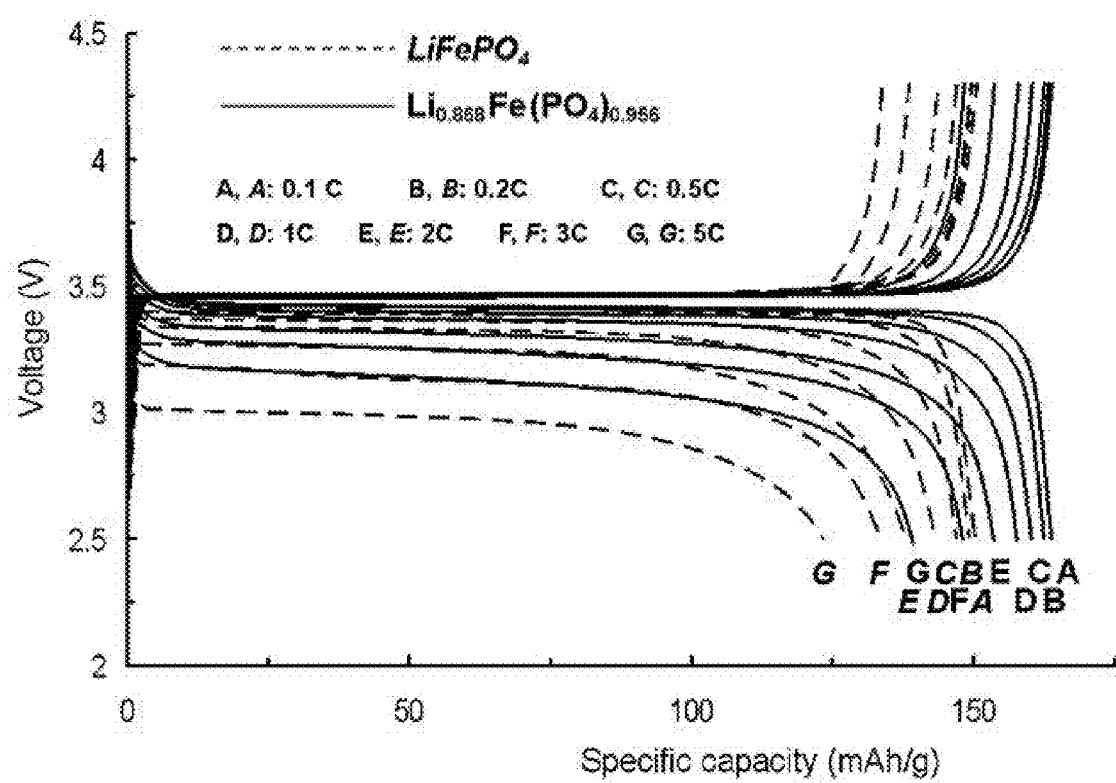
FIG. 14 shows the charge/discharge curves of $LiFePO_4$ of Comparative Example 3 and $Li_{0.868}Fe(PO_4)_{0.956}$ of Example 3 obtained by charging at a fixed C-rate of 0.2 C and discharging at varying rates of 0.1 C, 0.2 C, 0.5 C, 1 C, 2 C, 3 C, and 5 C.

FIG. 14 shows charge/discharge curves obtained by charging at a fixed C-rate of 0.2 C and discharging at varying rates of 0.1 C, 0.2 C, 0.5 C, 1 C, 2 C, 3 C, and 5 C. (Because the tests were conducted to investigate discharge characteristics, the charge rates were fixed at 0.2 C.) For the tests, batteries were fabricated under the same conditions except that the electrode materials were the $Li_{0.868}Fe(PO_4)_{0.956}$ obtained from Example 3 or the $LiFePO_4$ obtained from Comparative Example 3. In the figure, the solid lines correspond to batteries adopting the $Li_{0.868}Fe(PO_4)_{0.956}$ and the dashed lines are for batteries adopting the $LiFePO_4$. FIG. 14 shows that as the C-rate increases gradually from 0.1 C to 5 C, the battery capacities gradually decrease in both types of batteries.

As shown in FIG. 14, in comparison with the conventional $LiFePO_4$ at all C-rates, the $Li_{0.868}Fe(PO_4)_{0.956}$ of the present invention shows smaller plateau potential differences between the charge and discharge curves, exhibits wider and higher potential plateaus, and is higher in discharge capacity.

In general, stoichiometric lithium iron phosphates have a fundamental problem of low lithium ion diffusion rates. However, in the case of an anion-deficient non-stoichiometric lithium iron phosphate, the gap between charge and discharge potentials is relatively small, which is because the shortage of negative ions generates anion vacancies and these vacancies enlarge lithium diffusion routes, resulting in a gentle concentration gradient of lithium ions from the surface to the center of a granule.

If discharge capacity and discharge potential increase, the total discharge energy generated during discharge increases. The discharge energy of a battery is calculated by multiplying discharge capacity by discharge potential, and it corresponds to the area under the curve in a discharge voltage vs. discharge capacity plot.

Also, it is possible to calculate energy density (energy per weight or volume of a battery) from the amount of discharge energy of a battery. As compared with stoichiometric lithium iron phosphates, a compound of the present invention shows improved discharge capacity and output characteristics and thus enables fabrication of batteries having higher energy density.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the methods described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An electrode-active anion-deficient non-stoichiometric lithium iron phosphate of the formula $Li_{1-x}Fe(PO_4)_{1-y}$, wherein $0.06 \leq x \leq 0.15$ and $0.02 \leq y \leq 0.05$.

2. The lithium iron phosphate of claim 1, wherein $0.03 \leq y \leq 0.05$.

3. A cathode of a secondary battery, comprising an electrode-active anion-deficient non-stoichiometric lithium iron phosphate of the formula $Li_{1-x}Fe(PO_4)_{1-y}$, wherein $0.06 \leq x \leq 0.15$ and $0.02 \leq y \leq 0.05$.

4. The cathode of claim 3, wherein $0.03 \leq y \leq 0.05$.

5. A secondary battery comprising:
 (a) a cathode comprising an electrode-active anion-deficient non-stoichiometric lithium iron phosphate of the formula $Li_{1-x}Fe(PO_4)_{1-y}$, wherein $0.06 \leq x \leq 0.15$ and $0.02 \leq y \leq 0.05$;
 (b) an anode;
 (c) a separator; and
 (d) an electrolyte.

6. The secondary battery of claim 5, wherein $0.03 \leq y \leq 0.05$.

7. A method for preparing an electrode-active anion-deficient non-stoichiometric lithium iron phosphate of the formula $Li_{1-x}Fe(PO_4)_{1-y}$, wherein $0 < x \leq 0.15$ and $0 < y \leq 0.05$, said method comprising the steps:
 (a) mixing an iron precursor, a phosphate compound, an alkalinizing agent, and a lithium precursor to prepare a precursor of a lithium iron phosphate;
 (b) mixing the precursor of lithium iron phosphate of step (a) with water under reaction conditions of a temperature of 200~700° C., and a pressure of 180~550 bar to produce an anion-deficient non-stoichiometric lithium iron phosphate, and drying the thus-obtained compound; and
 (c) subjecting the resultant compound of step (b) either to calcination or to granulation and subsequent calcination.

8. The method of claim 7, wherein $0.01 \leq y \leq 0.05$.

9. The method of claim 7, wherein $0.03 \leq y \leq 0.05$.

10. The method of claim 7, wherein the pH of the reaction conditions in step (b) is greater than 4 and equal to or less than 9.

* * * * *